United States Patent
Kobayashi et al.

(10) Patent No.: US 9,733,997 B2
(45) Date of Patent: Aug. 15, 2017

(54) EVENT MANAGEMENT METHOD AND DISTRIBUTED SYSTEM

(71) Applicant: FUJITSU LIMITED, Kawasaki-shi, Kanagawa (JP)

(72) Inventors: Kenji Kobayashi, Kawasaki (JP); Nobutaka Imamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/144,385

(22) Filed: May 2, 2016

(65) Prior Publication Data
US 2016/0246656 A1  Aug. 25, 2016

Related U.S. Application Data

(63) Continuation of application No. PCT/JP2013/080688, filed on Nov. 13, 2013.

(51) Int. Cl.
G06F 9/44    (2006.01)
G06F 9/54    (2006.01)

(52) U.S. Cl.
CPC .................. G06F 9/542 (2013.01)

(58) Field of Classification Search
CPC ....................................................... G06F 9/542
See application file for complete search history.

(56) References Cited

U.S. PATENT DOCUMENTS 6,512,990 B1  1/2003  Woods et al.
6,618,815 B1  9/2003  Atkins et al.
2003/0135541 A1  7/2003  Maeda et al.
2008/0072221 A1  3/2008  Chkodrov et al.
2012/0084356 A1*  4/2012  Ferdi .................. H04L 65/1093
                                                                 709/204
2012/0163520 A1*  6/2012  Liu ....................... G01S 5/0018
                                                                 375/356
2013/0297960 A1*  11/2013  Quinton .................... G06F 1/12
                                                                 713/400

(Continued)

FOREIGN PATENT DOCUMENTS

EP    1315094         5/2003
EP    1315094 A1      5/2003

(Continued)

OTHER PUBLICATIONS

International Search Report, mailed in connection with PCT/JP2013/080688 and mailed Dec. 17, 2013 (1 page).

(Continued)

Primary Examiner — Timothy A Mudrick
Assistant Examiner — Abdou Seye
(74) Attorney, Agent, or Firm — Fujitsu Patent Center

(57) ABSTRACT

A first information processing apparatus executes a first process, while a second information processing apparatus executes a second process. The first information processing apparatus obtains a first issuance request produced by the first process. The first information processing apparatus also receives issuance timing information that the second information processing apparatus issues in response to a second issuance request from the second process. Based on this issuance timing information, the first information processing apparatus controls issuance timing of a timer event that is to be issued to the first process in response to the first issuance request.

10 Claims, 24 Drawing Sheets

(56) References Cited

U.S. PATENT DOCUMENTS

2014/0126567 A1* 5/2014 Husain .................. H04B 7/024
370/350

FOREIGN PATENT DOCUMENTS

| EP | 2615548 | 7/2013 |
|----|---------|--------|
| JP | 06-180660 | 6/1994 |
| JP | 2000-259429 | 9/2000 |
| JP | 2001-125878 | 5/2001 |
| JP | 2001-243093 | 9/2001 |
| JP | 2001-282754 | 10/2001 |
| JP | 2001-297071 | 10/2001 |
| JP | 2009-087190 | 4/2009 |
| JP | 2009-187567 | 8/2009 |
| WO | 2012/032572 | 3/2012 |

OTHER PUBLICATIONS

Extended European Search Report dated Oct. 28, 2016 for corresponding European Patent Application No. 13897409.2, 7 pages.

* cited by examiner

FIG. 13

| | SHARING MANAGEMENT TABLE | | | | | | 331 |
|---|---|---|---|---|---|---|---|
| QUERY NAME | OPERATOR NAME | ARRIVAL TIME | STANDBY TIME | FIRING INTERVAL | FIRING LIMIT COUNT | MINIMUM DUE TIME | REGISTRATION STATUS |
| Query1 | TimeOpe1 | 00:00:01 | 5 seconds | 5 seconds | 10,000 | 2 seconds | FINAL |

FIG. 14

EVENT MANAGEMENT TABLE 332

| QUERY NAME | OPERATOR NAME | FIRST FIRING TIME | FIRING INTERVAL | FIRING LIMIT COUNT | FIRING COUNT | REGISTRATION STATUS |
|---|---|---|---|---|---|---|
| Query1 | TimeOpe1 | 00:00:06 | 5 seconds | 10,000 | 100 | Tentative |

FIG. 15

| ROUTING TABLE | | | | 333 |
|---|---|---|---|---|
| EVENT NAME | QUERY NAME | OPERATOR NAME | NODE NAME | |
| Event1 | Query1 | Ope1 | Node1 | |
| Event2 | Query1, Query2 | Ope1 | Node1, Node2 | |
| TimeEvent1 | Query1 | TimeOpe1 | Local | |
| TimeEvent2 | Query2 | TimeOpe1 | Local | |
| TimeEvent_Ctl1 | Query1 | TimeOpe1 | Node1, Node2 | |
| TimeEvent_Ctl2 | Query2 | TimeOpe1 | Node1 | |

FIG. 16

| QUERY NAME | OPERATOR NAME | TIMER REQUEST | | | |
|---|---|---|---|---|---|
| | | ARRIVAL TIME | STANDBY TIME | FIRING INTERVAL | FIRING LIMIT COUNT |
| Query1 | TimeOpe1 | 00:00:01 | 5 seconds | 5 seconds | 10,000 |

| QUERY NAME | OPERATOR NAME | SOURCE | CONTROL TYPE | ARRIVAL TIME | STANDBY TIME | FIRING INTERVAL | FIRING LIMIT COUNT |
|---|---|---|---|---|---|---|---|
| Query1 | TimeOpe1 | Node1 | Confirm | 00:00:01 | 5 seconds | 5 seconds | 10,000 |

EVENT CONTROL NOTICE

62

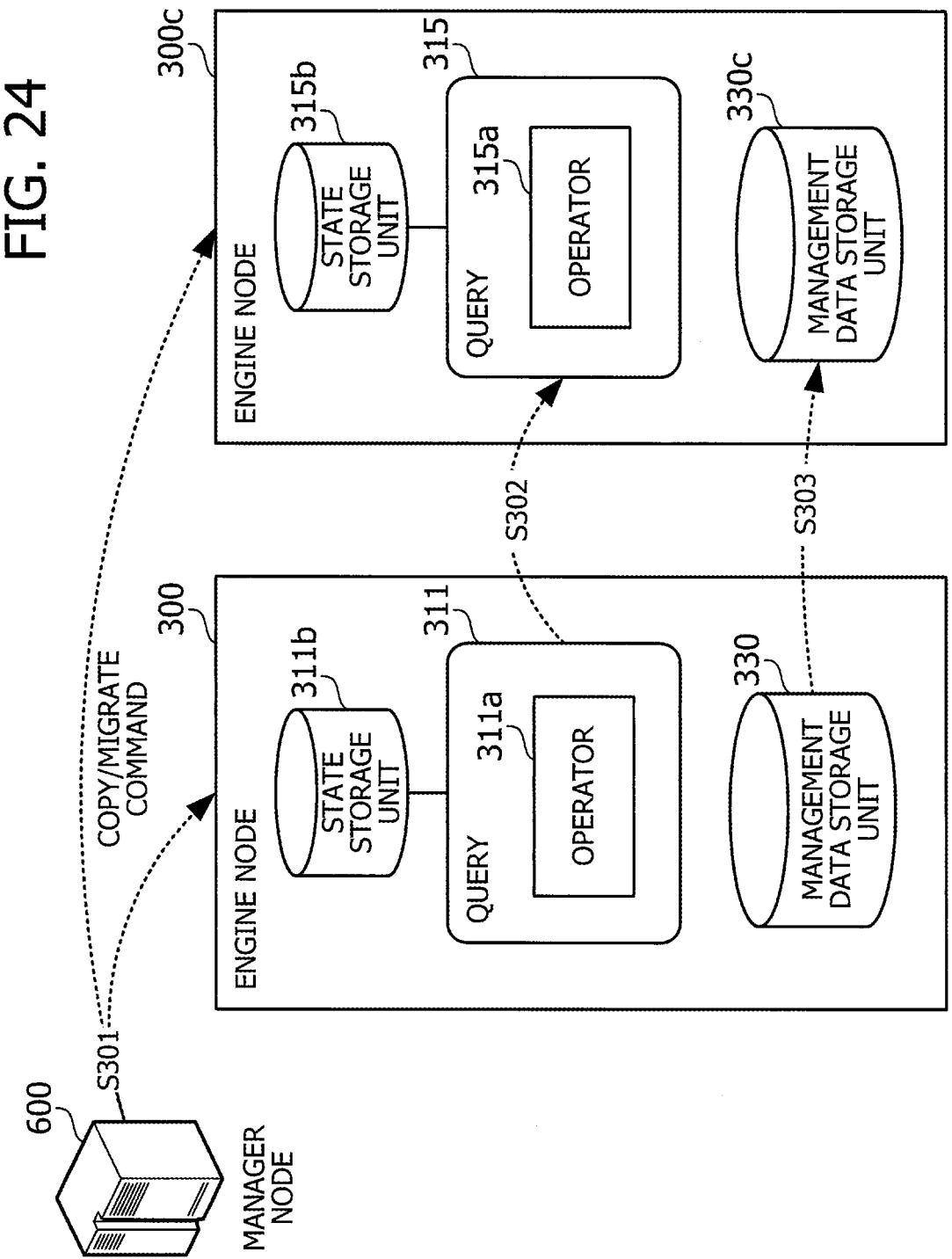

EVENT MANAGEMENT METHOD AND DISTRIBUTED SYSTEM

CROSS-REFERENCE TO RELATED APPLICATION

This application is a continuation application of International Application PCT/JP2013/080688 filed on Nov. 13, 2013 which designated the U.S., the entire contents of which are incorporated herein by reference.

FIELD

The embodiments discussed herein relate to an event management program, an event management method, and a distributed system.

BACKGROUND

Recent years have seen the use of data processing systems to collect and analyze a large amount of data and extract useful information from the collected data. Some of those large-scale data processing systems are designed to sequentially manipulate data as it arrives in the form of a continuous stream. The large-scale stream data processing systems of this kind are often used for a realtime analysis of data. As an example, one system collects records of credit card payments and detects credit cards that appear to be used illegally, such as those used repeatedly in different stores within a short time period. As another example, there is a system that estimates traffic congestion on the basis of realtime data of vehicle speeds collected with sensors deployed on the roads.

The large-scale stream data processing discussed above may also be called "complex event processing" (CEP). For example, the user of CEP creates a program module that describes data patterns to be detected, as well as a data processing method and other things suitable for those patterns. When executed, this program module keeps track of continuously arriving data and extracts and processes data that matches with any of the patterns. The term "query" may be used in the context of CEP to refer to such a program module or to an individual runtime instance of that program module.

To deal with many pieces of data arriving in each unit time, a large-scale stream data processing system may be implemented as a distributed system having a plurality of computers (physical machines). Such distributed systems are capable of executing identical program modules (e.g., copies of a single program module) at different computers in parallel. The incoming data is distributed to a plurality of processes (instances) that are running on different computers according to such a program module. Data processing operations described in the program module are parallelized in this way, and the system provides enhanced performance.

One proposed distributed system synchronizes a plurality of nodes in terms of their time of date (TOD). Specifically, this distributed system selects a master node out of the plurality of nodes and causes the master node to broadcast a TOD packet containing the current TOD value to other nodes. The receiving nodes update their local TOD values on the basis of the received TOD packet.

See, for example, Japanese Laid-open Patent Publication No. 2001-297071.

The users may create a program module that relies on a timer to execute data manipulation according to the relative time since a specific time point at which a certain condition is met. Suppose, for example, a program module that accumulates data during a period of N seconds for later analysis, where N is a positive integer. The timer gives this N-second period, when a certain type of data arrives for the first time.

The above timer-reliant program module may be executed as is on a plurality of computers for parallel data processing. This simple parallelization, however, has some problems described below. Data is manipulated in a distributed manner by a plurality of processes running on different computers. It is therefore possible that different processes may recognize their "certain condition" (e.g., their reception of the first data) at different times. Further, the computers usually manage their respective timers independently of one another, and the plurality of processes of the timer-reliant program module could run with some misalignment of time bases, thus producing data processing results that are different from those produced in the case of serial data processing.

One possible solution is to create a program module taking into consideration the possibility of parallel execution on multiple computers. In other words, the user is to write a parallel-executable program module in an explicit manner. This approach, however, imposes a greater load on the user and also makes it difficult for the system to manage its parallelism.

SUMMARY

In one aspect, there is provided a non-transitory computer-readable storage medium storing a program for controlling a distributed system that performs distributed processing with a plurality of processes, wherein the program causes a computer to perform a procedure including: obtaining a first timer event issuance request produced by a first process that the computer executes as one of the plurality of processes; receiving timer event issuance timing information from another computer that executes a second process as another one of the plurality of processes, the timer event issuance timing information relating to a timer event to be issued by said another computer in response to a second timer event issuance request produced by the second process; and controlling issuance timing of a timer event to the first process in response to the first timer event issuance request, based on the timer event issuance timing information that is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 13 illustrates an example of a sharing management table;

FIG. 14 illustrates an example of an event management table;

FIG. 15 illustrates an example of a routing table;

FIG. 16 illustrates an example of a timer request;

FIG. 17 illustrates an example of an event control notice;

FIG. 24 illustrates an example of management operations performed when a new engine node is added.

DESCRIPTION OF EMBODIMENTS

Several embodiments will now be described below with reference to the accompanying drawings.

(a) First Embodiment

Figure 1:
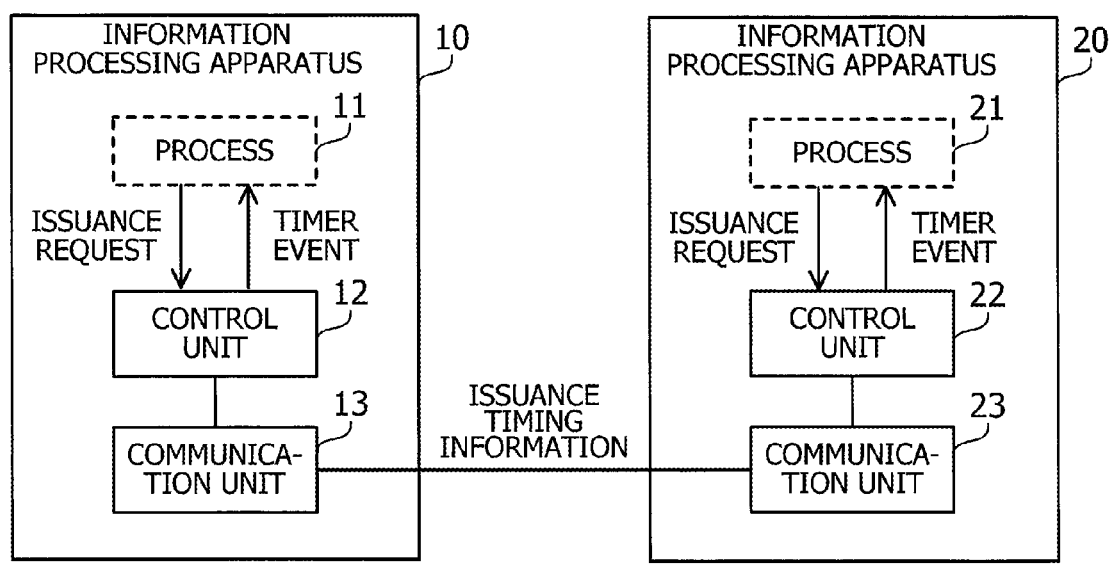
FIG. 1 illustrates a distributed system according to a first embodiment.

FIG. 1 illustrates a distributed system according to a first embodiment.

The first embodiment proposes a distributed system that manipulates data with a plurality of processes in a distributed manner. This distributed system includes two information processing apparatuses 10 and 20. These information processing apparatuses 10 and 20 may be called physical machines, computers, server devices, and the like.

One information processing apparatus 10 runs a process 11, while another information processing apparatus 20 runs another process 21. These processes 11 and 21 are execution entities invoked on the basis of program modules that are equal in the procedures they describe. For example, the processes 11 and 21 have been invoked by identical program modules copied from a single source program module. The processes 11 and 21 may be called threads, tasks, jobs, and the like, or may be referred to as "queries" in the CEP terminology. Incoming data to the distributed system is apportioned to these processes 11 and 21. The processes 11 and 21 thus perform the same processing operations on different pieces of data simultaneously.

The information processing apparatus 10 includes a control unit 12 and a communication unit 13, and its peer information processing apparatus 20 also includes a control unit 22 and a communication unit 23. The control units 12 and 22 may be implemented as, for example, processors. The processors may be central processing units (CPU) or digital signal processors (DSP), and may include application-specific integrated circuits (ASIC), field-programmable gate arrays (FPGA), and other integrated circuits. Each processor executes programs stored in, for example, a random access memory (RAM) or other semiconductor memory devices. The term "processor" may further include a multiprocessor system, or a group of processors. The communication units 13 and 23 are interfaces for communication between information processing apparatuses. The communication units 13 and 23 may be designed for a wired network or a wireless network.

The control unit 12 receives a request for issuance of a timer event (referred to as a "first issuance request") that the process 11 produces when it is needed. This first issuance request may be produced when the process 11 is about to start a data processing operation according to a relative time from a time point at which a specific condition is met (e.g., receipt of a type of data for the first time). Upon receipt of a first issuance request from the process 11, the control unit 12 configures a timer to issue a timer event to the process 11 at an appropriate time. The timer event tells the process 11 when to start the data processing operation. Similarly to the above, another control unit 22 receives a request for issuance of a timer event (referred to as a "second issuance request") that the process 21 produces when it is needed. Upon receipt of a second issuance request from the process 21, the control unit 22 configures its timer to issue a timer event to the process 21 at an appropriate time. The two information processing apparatuses 10 and 20 manage their respective timers independently of each other.

Here the parallel processes 11 and 21 may detect different time points as satisfying a specific condition because they are manipulating different pieces of data. For example, one process 11 recognizes its own "earliest reception time" of data objects that are assigned out of those received by the distributed system. The other process 21 recognizes its own "earliest reception time" of data objects that are assigned out of the same. On the other hand, the program modules describing what the processes 11 and 21 do may intend to recognize an "earliest reception time" of all the data objects that the distributed system has received. The proposed control units 12 and 22 are thus designed to cause the two information processing apparatuses 10 and 20 to share issuance timing information. This issuance timing information will be used to determine the right time to issue timer events, and the sharing of issuance timing information enables the information processing apparatuses 10 and 20 to issue their timer events at the same time.

More specifically, the control unit 12 transmits issuance timing information for timer events to the peer information processing apparatus 20 via the communication unit 13 when a first issuance request is received from the process 11. This issuance timing information indicates, for example, what the process 11 recognizes as a "first reference time." The first reference time may indicate when the process 11 detected a data object that satisfies a specific condition, or when the control unit 12 obtained a first issuance request. For the former case of the first reference time, the process 11 may add its source information into a first issuance request when producing it. The peer control unit 22 is ready to receive issuance timing information coming from the information processing apparatus 10. When the communication unit 23 receives issuance timing information, the control unit 22 controls the issuance timing of timer events to its local process 21, taking the received issuance timing information into consideration (e.g., considering the first reference time indicated therein). Note that, for example, the control unit 22 will issue a timer event to the process 21 in response to a second issuance request that the process 21 produces.

Similarly to the above, the control unit 22 also transmits issuance timing information for timer events to the peer information processing apparatus 10 via the communication unit 23 when a second issuance request is received from the process 21. This issuance timing information indicates, for example, what the process 21 recognizes as a "second reference time." The peer control unit 12 is ready to receive issuance timing information coming from the information processing apparatus 20. When the communication unit 13 receives issuance timing information, the control unit 12 controls the issuance timing of timer events to its local process 11, taking received issuance timing information into consideration (e.g., considering the second reference time indicated therein). Note that, for example, the control unit 12 will issue a timer event to the process 11 in response to a second issuance request that the process 11 produces.

For example, when both the processes 11 and 21 have produced an issuance request, the control units 12 and 22 compare the first reference time with the second reference time and determine a common reference time for the two information processing apparatuses 10 and 20. This common reference time may be, for example, either the first reference time or the second reference time, whichever is smaller in value. The information processing apparatuses 10 and 20 may execute together a finalization procedure to establish their common reference time. The control units 12 and 22 independently manage their respective timers on the basis of the established common reference time. For example, the control units 12 and 22 may issue their respective timer events a certain amount of wait time after the common reference time. The amount of this wait time may be specified by the processes 11 and 21.

Suppose, for example, that one program module intends to accumulate incoming data for analysis purposes during a period of N seconds after reception of a specific type of data in the first place. Having been invoked from this program module, two processes 11 and 21 detect the first arrival of specific data of interest and thus produce an issuance request individually. It is possible, however, that their issuance requests may have some time difference. The control units 12 and 22, on the other hand, unifies the reference times of their local timers, meaning that the control units 12 and 22 share the objective value of an earliest arrival time. The control units 12 and 22 are therefore capable of issuing their respective timer events N seconds after the objectively earliest arrival time as originally intended by the program module, thus permitting the processes 11 and 21 to align their N-second time windows for accumulating analysis source data.

In operation of the distributed system described in the first embodiment, a process 11 running in one information processing apparatus 10 produces an issuance request, and this issuance request causes transmission of issuance timing information to a peer information processing apparatus 20 for use in its timer management. Another process 21 running in the information processing apparatus 20 may similarly produce an issuance request, causing transmission of issuance timing information to the information processing apparatus 10 for use in its timer management. These pieces of issuance timing information permit the two information processing apparatuses 10 and 20 to efficiently synchronize their issuance of timer events to the processes 11 and 21. For example, the information processing apparatuses 10 and 20 unify their reference times so as to manage timers on the basis of a common reference time.

In addition to the above, a plurality of processes (e.g., processes 11 and 21) produce the same intended processing result as in the case of non-parallel execution of the same, even though their source program module is not particularly designed for parallel event processing operations. This nature contributes to smooth parallelization of data manipulation and performance enhancement of the distributed system. The users can write program modules with less burden since they do not need to explicitly describe a parallelization procedure. The proposed distributed system also makes management of parallelism easier, because the degree of parallelism may be dynamically changed (i.e., the number of processes may be varied).

(b) Second Embodiment

Figure 2:
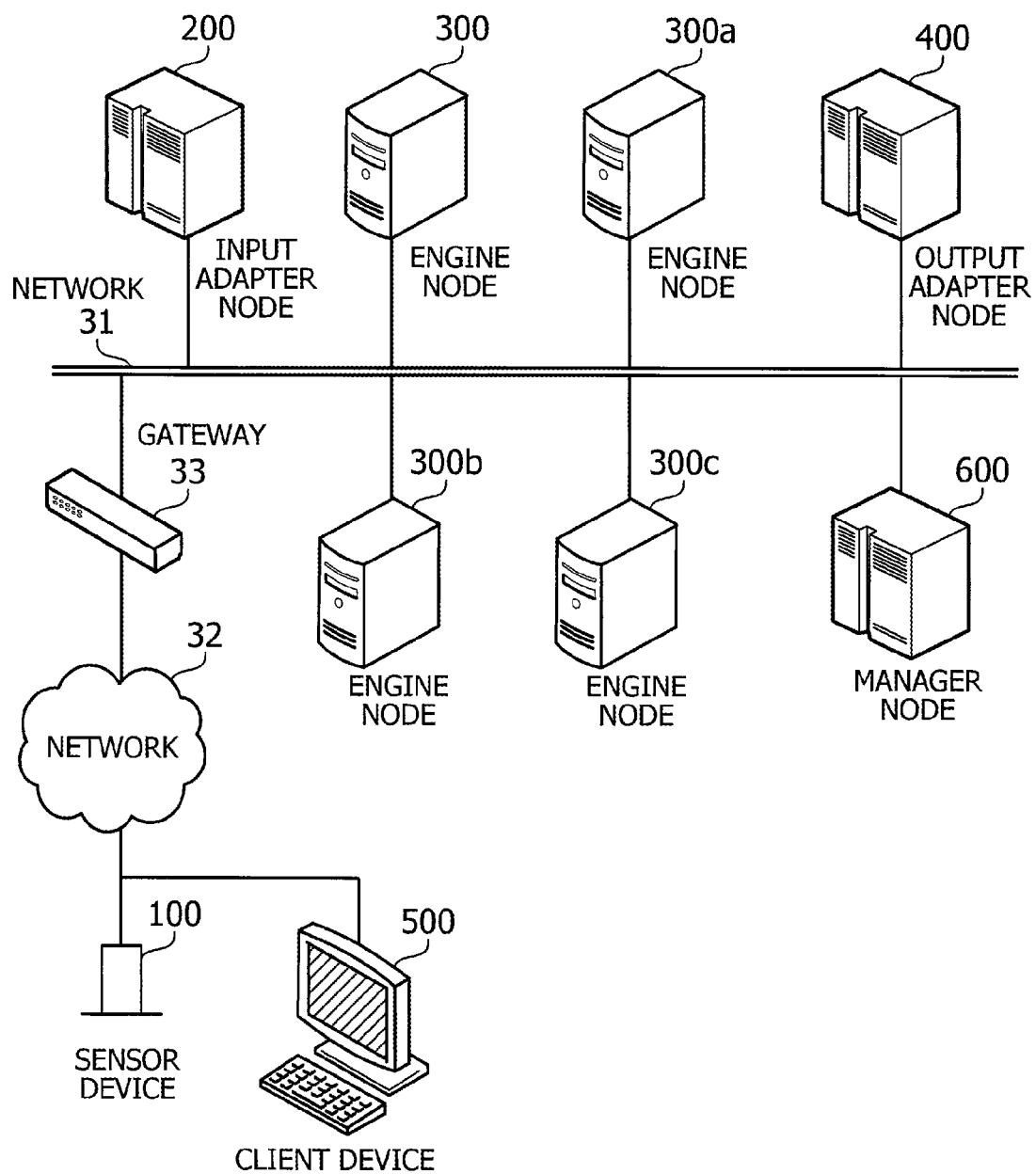
FIG. 2 illustrates a distributed system according to a second embodiment.

FIG. 2 illustrates a distributed system according to a second embodiment. The illustrated distributed system of the second embodiment is an information processing system for a realtime analysis of sensor data. That is, this system analyzes a large amount of sensor data received from a sensor device, and the result of the analysis is provided to a client device. The sensor data may be a realtime data stream of, for example, vehicle speeds collected from an on-road speed sensor. The collected vehicle speed data is analyzed to predict traffic jams. Another example of sensor data is a series of log records of credit card payments, which are collected from card readers deployed in retail stores. This data is analyzed to detect illegal use of credit cards.

The illustrated distributed system of the second embodiment is formed from networks 31 and 32, a gateway 33, a sensor device 100, an input adapter node 200, engine nodes 300, 300a, 300b, and 300c, an output adapter node 400, a client device 500, and a manager node 600. The engine nodes 300, 300a, 300b, and 300c are an exemplary implementation of the information processing apparatuses 10 and 20 discussed in the first embodiment.

The input adapter node 200, engine nodes 300, 300a, 300b, and 300c, output adapter node 400, and manager node 600 are connected to one network 31. The sensor device 100 and client device 500 are connected to another network 32. The two networks 31 and 32 are connected together via the gateway 33.

The two networks 31 and 32 may use different protocols. For example, one network 31 may be a local area network (LAN), while the other network 32 may be a wide area network such as the Internet. The gateway 33 serves as a network node for interconnecting different protocols. Specifically, the gateway 33 translates one protocol into another protocol so that the networks 31 and 32 can communicate with each other.

The sensor device 100 sends sensor data to the input adapter node 200. The input adapter node 200 is a computer that receives sensor data from the sensor device 100 and converts the received sensor data into another form of data, called "events," for later processing by queries.

The term "query" denotes an event-driven data processing entity that is activated upon arrival of events. A query in the second embodiment is an instance created on the basis of a user-scripted query program. Queries may be called processes, threads, tasks, jobs, objects, or others. A single query program may produce a plurality of instances, or queries, for parallel processing. These queries are deployed in a plurality of engine nodes 300, 300a, 300b, and 300c, so that each engine node undertakes one or more queries. The input adapter node 200 sends events to one engine node (e.g., engine node 300) according to a defined flow.

The engine nodes 300, 300a, 300b, and 300c are computers that execute queries. As will be described later, the queries work together to perform information processing operations according to a defined flow. A query receives an event from the input adapter node 200 or its preceding query, executes a particular processing operation depending on the received event and outputs another event as the execution result. This output event may be a collection of received events accumulated in a fixed period of time, or may be a new event produced on the basis of the received event. The output event is sent from its source query to a succeeding query or to the output adapter node 400. When there are a plurality of succeeding queries for parallel processing purposes, they may receive a plurality of events from the source query. Such events may be passed from one query to another query within a single engine node or across two different engine nodes.

The second embodiment assumes that three engine nodes 300, 300a, and 300b are working as active nodes, while another engine node 300c stays inactive. The latter engine node 300c is a spare engine node that would be used when the former engine nodes 300, 300a, and 300b encounter a heavy load condition. The system in the second embodiment assigns queries to physical computers (physical machines). However, the engine nodes 300, 300a, 300b, and 300c may also be virtual computers (virtual machines).

The output adapter node 400 is a computer configured to receive events representing a final result from an engine node (e.g., engine node 300b) according to a defined flow. The received events contain information indicating the result of a sensor data analysis. The output adapter node 400 converts the received events into another form of result data that is accessible to the client device 500. This result data is transmitted to the client device 500.

The client device 500 is a computer configured to receive result data indicating the result of a sensor data analysis from the output adapter node 400, so that the user can see the received result data. For example, the client device 500 outputs the result data on its display screen.

The manager node 600 is a computer configured to monitor the load on each engine node 300, 300a, and 300b and control their working status and query assignments. Depending on the load condition of those engine nodes 300, 300a, and 300b, the manager node 600 may add a new active engine node to the system or remove an existing engine node from the system. The manager node 600 may also migrate queries from one engine node to another for the purpose of load distribution. In addition, the manager node 600 may increase or decrease the degree of parallelism, i.e., the number of queries invoked from a single query program, for load distribution purposes.

Suppose now that a sensor data analysis is performed in the following flow. That is, the input adapter node 200 receives sensor data from the sensor device 100 and converts the received sensor data into events for transmission to one engine node 300. A query is running in the first engine node 300 to perform the first stage of processing. The first engine node 300 processes the received events accordingly and distributes its result as output events to engine nodes 300, 300a, and 300b. A plurality of queries are running on the engine nodes 300, 300a, and 300b to provide the second stage of processing. These second-stage queries have been invoked from a single query program.

The engine nodes 300, 300a, and 300b simultaneously manipulate different events received from one particular engine node 300 and send output events containing their respective results to another particular engine node 300b. The engine node 300b is executing yet another query for the third stage of processing. The engine node 300b processes the received events accordingly and sends output events containing its processing result to the output adapter node 400. The output adapter node 400 converts the received events into result data and transmits it to the client device 500.

Figure 3:
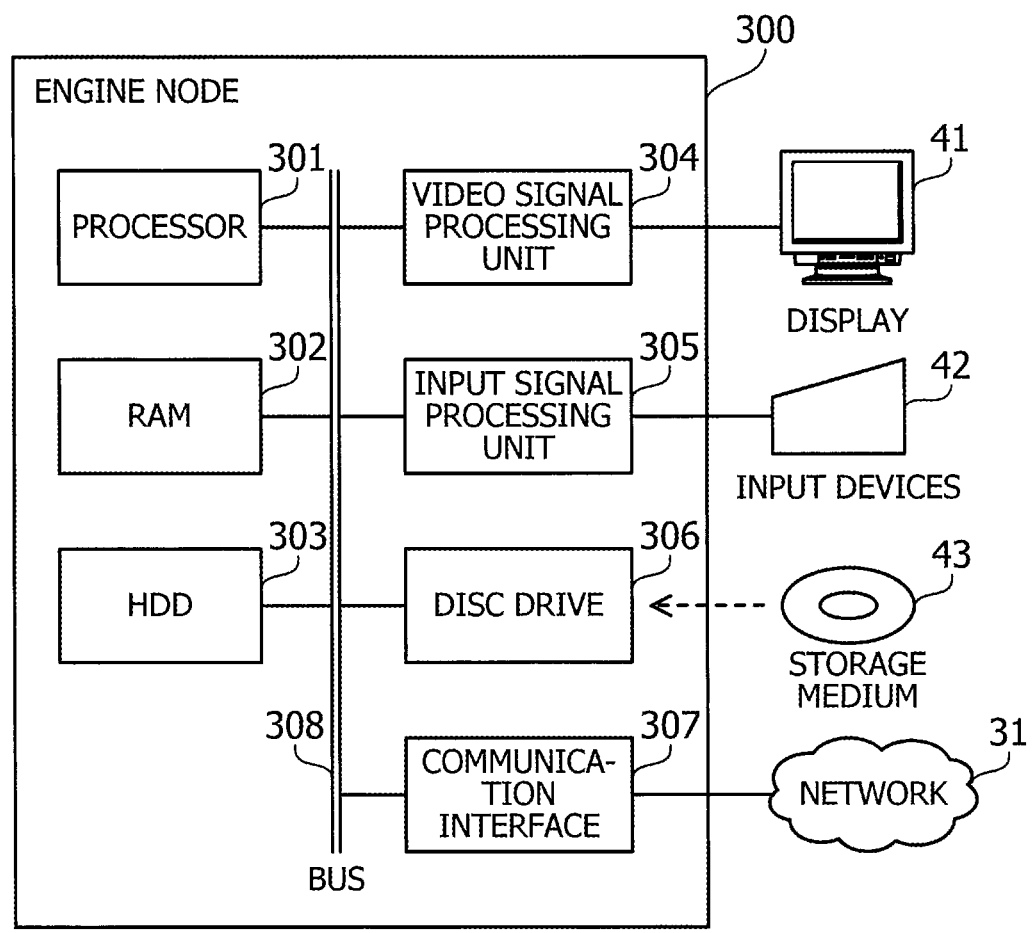
FIG. 3 is a block diagram illustrating an exemplary hardware configuration of an engine node.

FIG. 3 is a block diagram illustrating an exemplary hardware configuration of an engine node. This engine node 300 includes a processor 301, a RAM 302, a hard disk drive (HDD) 303, a video signal processing unit 304, an input signal processing unit 305, a disc drive 306, and a communication interface 307. These components are connected to a bus 308 in the engine node 300. The processor 301 is an exemplary implementation of the control units 12 and 22 discussed in the first embodiment. The communication interface 307 is an exemplary implementation of the communication units 13 and 23 discussed in the first embodiment.

The processor 301 is, for example, a CPU or other processor that contains arithmetic and logic units and other computational functions to execute programmed instructions. The processor 301 reads at least part of program and data files stored in the HDD 303 and executes programs after loading them to the RAM 302. The processor 301 may have a plurality of processor cores, and the engine node 300 may include a plurality of such processors. The engine node 300 may be configured to execute program instructions in parallel by using a plurality of processors or processor cores. A set of two or more processors (i.e., multiprocessor) may also be called a "processor." The processor 301 may include an FPGA, ASIC, or any other type of dedicated circuit.

The RAM 302 is a volatile memory device that serves as temporary storage for programs that the processor 301 executes, as well as for various data that the processor 301 uses when executing programs. Other type of memory devices may be used in place of or together with RAM, and the engine node 300 may have two or more sets of such non-volatile memory devices.

The HDD 303 serves as a non-volatile storage device to store program and data files of the operating system (OS), firmware, applications, and any other kind of software. The engine node 300 may have another kind of storage devices such as flash memories and a plurality of such non-volatile storage devices.

The video signal processing unit 304 produces video images in accordance with commands from the processor 301 and outputs them on a screen of a display 41 coupled to the engine node 300. The display 41 may be, for example, a cathode ray tube (CRT) display or a liquid crystal display.

The input signal processing unit 305 receives input signals from input devices 42 attached to the engine node 300 and supplies them to the processor 301. The input devices 42 may be, for example, a keyboard and a pointing device, such as mouse and touchscreen.

The disc drive 306 is a drive used to read programs and data stored in a storage medium 43. The storage medium 43 may include, for example, magnetic disk media such as a flexible disk (FD) and HDD, optical disc media such as a compact disc (CD) and digital versatile disc (DVD), and magneto-optical storage media such as a magneto-optical disc (MO). The disc drive 306 transfers programs and data read out of a storage medium 43 to, for example, the RAM 302 or HDD 303 according to commands from the processor 301.

The communication interface 307 communicates with other information processing apparatuses (e.g., engine node 300a) via a network 31 or the like.

Note that the foregoing disc drive 306 is optional for the engine node 300, and also that the engine node 300 may not include a video signal processing unit 304 or an input signal processing unit 305 when it is controlled from a user terminal. The display 41 and input device 42 may be integrated into the enclosure of the engine node 300. The hardware configuration discussed for the engine node 300 may similarly be used to implement the input adapter node 200, engine nodes 300a, 300b, and 300c, output adapter node 400, and client device 500.

Figure 4:
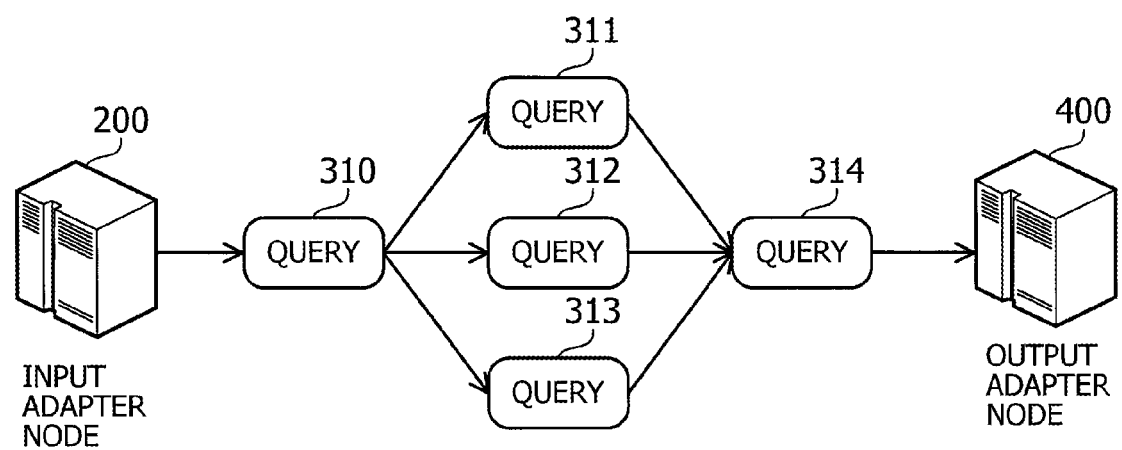
FIG. 4 illustrates an example of an execution order of queries.

FIG. 4 illustrates an example of an execution order of queries. Queries 310 and 311 are deployed in an engine node 300. A query 312 is deployed in another engine node 300a. Queries 313 and 314 are deployed in yet another engine node 300b.

Three queries 311, 312, and 313 have been invoked from a single query program, so that they similarly perform a processing operation on a plurality of different events in parallel. The description of the second embodiment may use the expression "queries of the same group" to refer to a group of identical queries invoked from a single query program. In contrast, the topmost query 310 has been invoked from another query program different from that of the query 311, 312, and 313. Likewise, the last query 314 has been invoked from yet another query program different from that of the query 311, 312, and 313. The description of the second embodiment may use the expression "different groups of queries" to refer to those queries invoked from different query programs.

The illustrated distributed system operates as follows. The topmost query 310 performs a processing operation according to events received from the input adapter node 200 and sends each resulting event to one of the subsequent queries 311, 312, and 313. Here the sending query 310 distributes its produced events to different queries 311, 312, and 313 such that they will be equally loaded with those events. The receiving queries 311, 312, and 313 process different events accordingly.

Each query 311, 312, and 313 performs a processing operation according to the individual events received from the query 310. Since they have been invoked from a single query program, all these queries 311, 312, and 313 apply the same operation on different events. The queries 311, 312, and 313 transmit their respective result events to the last query 314. This query 314 performs a processing operation according to each received event and transmits the resulting events to the output adapter node 400.

As can be seen from the above description, each query in the distributed system of the second embodiment is activated upon arrival of an event, executes a processing operation defined in its source query program, and produces another event. A plurality of such queries may be combined in series, making it possible to analyze a large amount of continuously coming sensor data in a realtime manner. The proposed system runs queries of the same group on different engine nodes (as in the queries 311, 312, and 313). This configuration enables parallel execution of a particular query program in distributed environments and thus increases the throughput. These queries 311, 312, and 313 are an exemplary implementation of the processes 11 and 21 discussed in the first embodiment.

Figure 5:
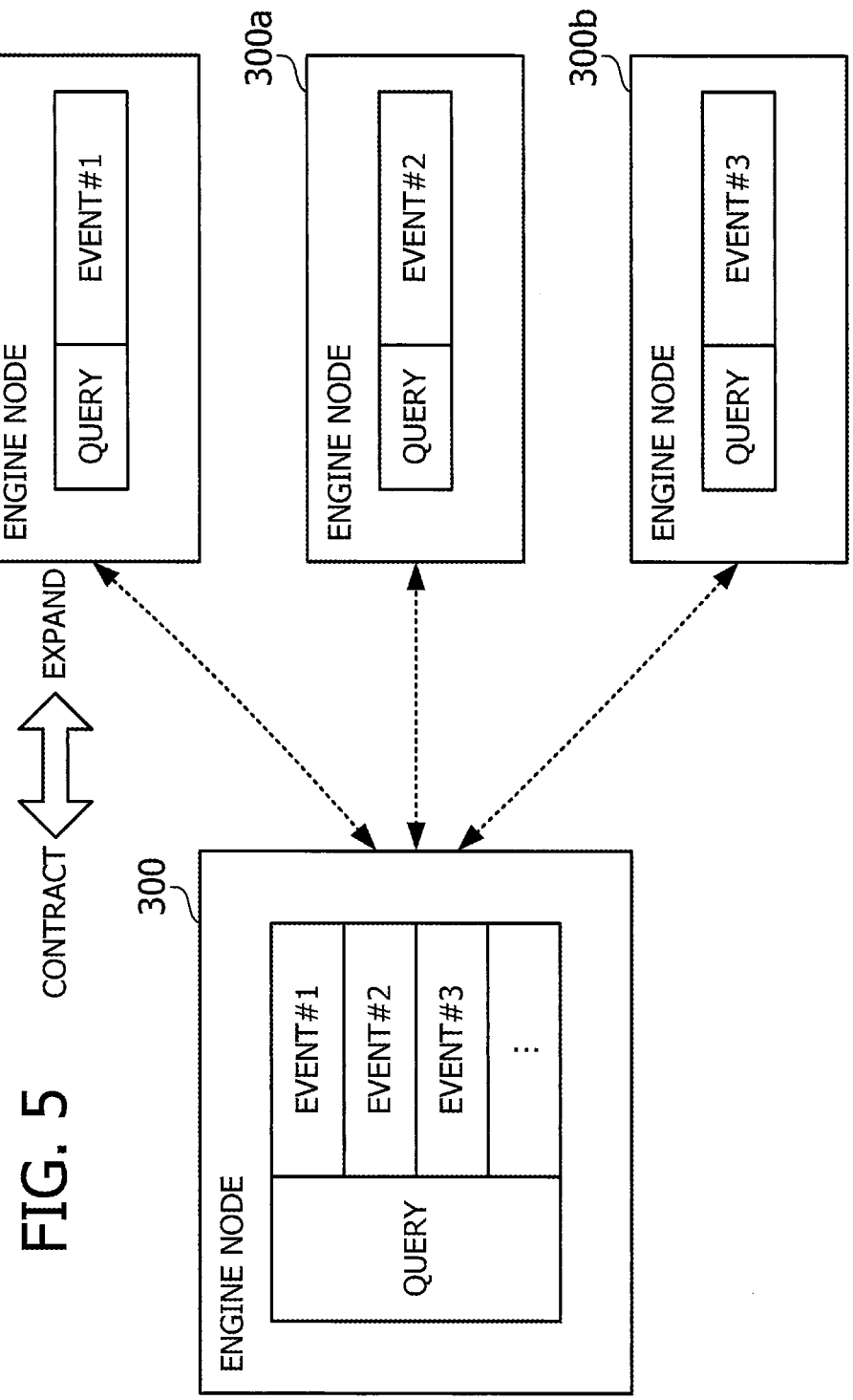
FIG. 5 illustrates an example of expansion or contraction of engine nodes.

FIG. 5 illustrates an example of expansion or contraction of engine nodes. It is assumed here that one query in an engine node 300 is processing three events #1, #2, and #3 that belong to different data ranges (e.g., their keys belong to different ranges). Suppose now that the engine node 300 experiences an excessive load, and the distributed system determines to parallelize the processing of events #1, #2, and #3 by using more engine nodes 300a and 300b.

To achieve the above, the query of interest is copied from the current engine node 300 to other engine nodes 300a and 300b. Copying queries means growing the group of queries (or raising the degree of parallelism). This is achieved by copying its corresponding query program to other engine nodes and causing them to run the copied programs. The processing operation defined in the query program will thus be executed simultaneously on multiple engine nodes 300, 300a, and 300b.

For example, event #1 is processed by one engine node 300, event #2 by another engine node 300a, and event #3 by yet another engine node 300b. That is, different data ranges are assigned respectively to three engine nodes 300, 300a, and 300b, thus allowing them to process different events in parallel. Destinations of events are determined on the basis of, for example, keys or other identifiers included in the events.

Suppose now that the engine nodes 300, 300a, and 300b see a drop of their load when they are processing events #1, #2, and #3, respectively. This drop of the load would permit the system to reduce the parallelism of queries from three to one. Accordingly, two of the previously copied queries are removed from, for example, engine nodes 300a and 300b, and the remaining engine node 300 will undertake all subsequent events, including those for the data ranges that were once assigned to the engine nodes 300a and 300b.

As can be seen from the above, the proposed distributed system according to the second embodiment may vary the degree of parallelism of queries dynamically according to the load condition of engine nodes 300, 300a, and 300b. Increasing the degree of parallelism may be referred to as "expansion of the system," and decreasing the same may be referred to as "contraction of the system." Expansion or contraction of the system also brings about a change in the data range assignment to individual queries of the same group. For example, the manager node 600 determines a new assignment and sends it to each relevant engine node 300, 300a, and 300b. With this new assignment, events produced by a query will be distributed across a new set of subsequent parallel queries of the same group.

Figure 6:
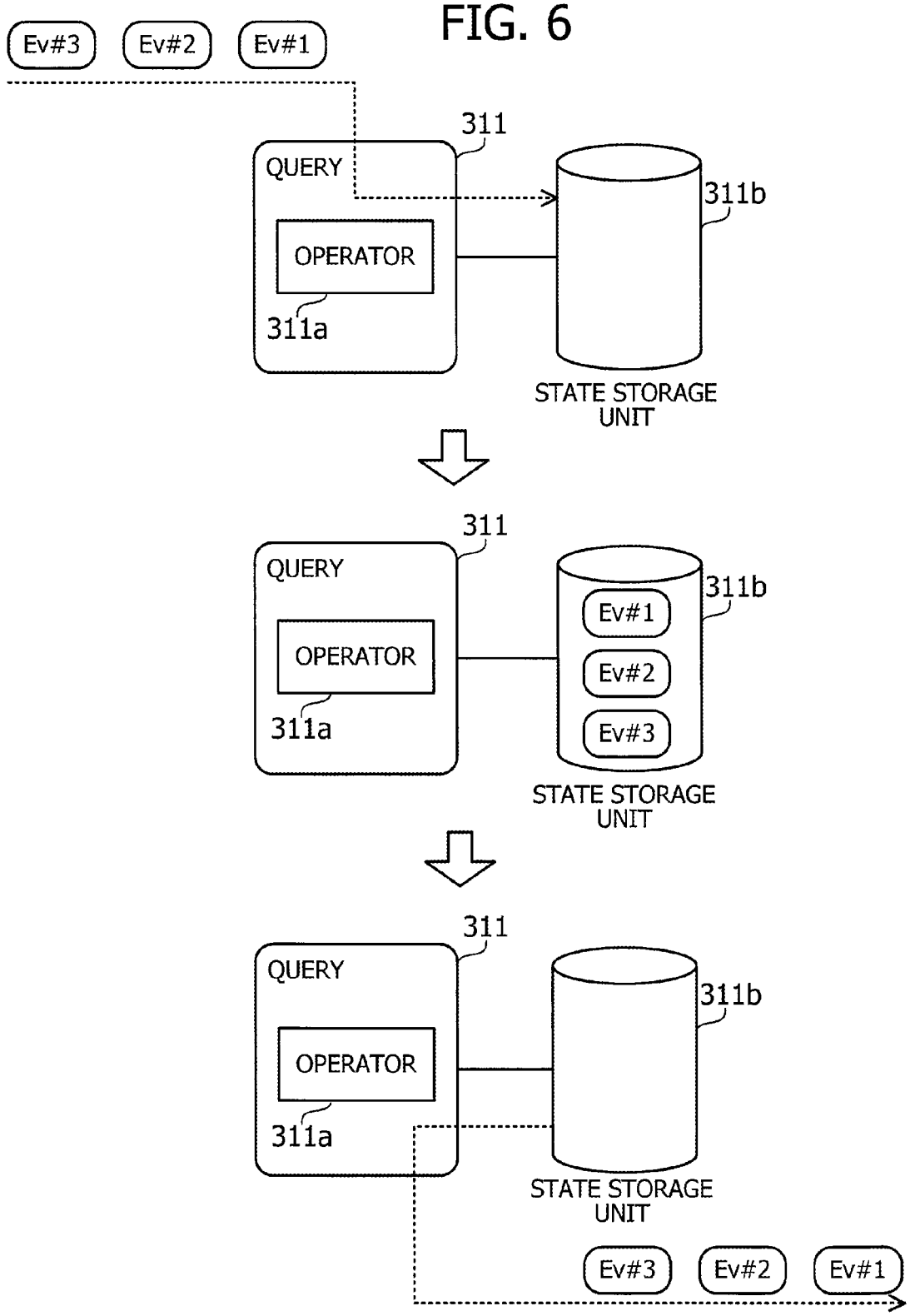
FIG. 6 illustrates an example of a time-base operator.
Figure 7:
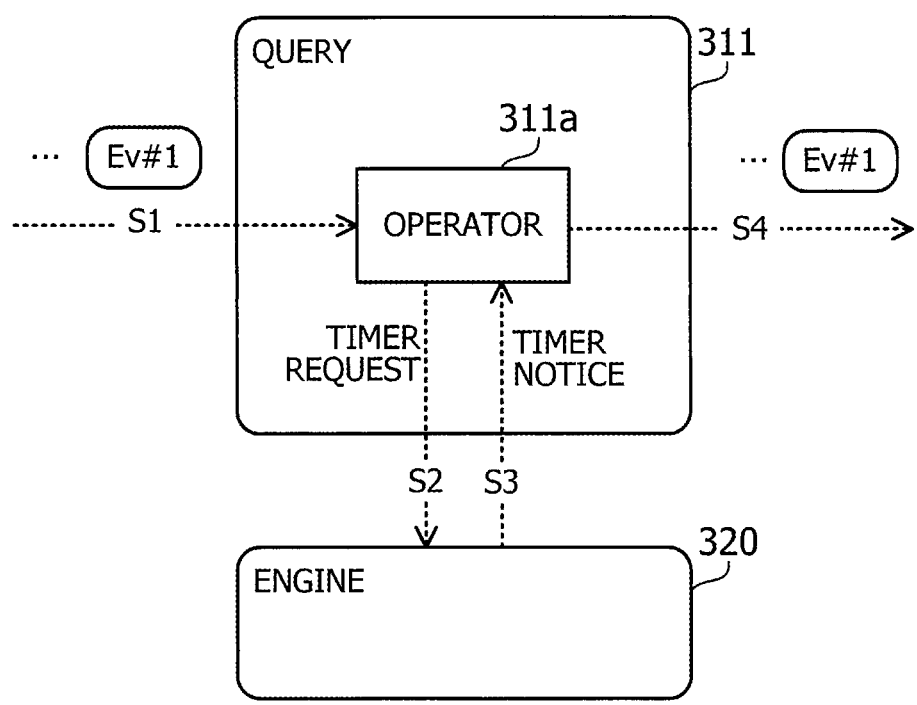
FIG. 7 illustrates an exemplary implementation of a time-base operator.

Referring next to FIGS. 6 and 7, the following description will explain time-base operators.

FIG. 6 illustrates an example of a time-base operator. The illustrated query 311 contains an operator 311a, which is actually an instance of an operator described in a query program and executed in its corresponding query. Operators include those corresponding to specific actions such as collecting events, retrieving events, and selecting events. Operators also include arithmetic operators, logical operators, relational operators, functions, and the like. One query may include a plurality of such operators. In that case, a tree structure is provided to define relationships among the operators, so that the operators are called up in the order specified in the tree structure.

Time-base operators are among the above-noted operators. Specifically, time-base operators are executed at a particular time point that satisfies a specific time-related condition. For example, a time-base operator may be triggered at a specific time relative to a given reference time. Think of a time-base operator that executes a processing operation a fixed time (e.g., four seconds) after an event is received. This processing operation may be repeated at regular intervals. The verb "fire" may be used to indicate that a time-base operator is executed when its time-related condition is satisfied.

The operator 311a in the query 311 is a time-base operator. The reference time of this operator 311a is set to a point at which an event is received in the first place after the query 311 is invoked. The operator 311a accumulates incoming events during a period of N seconds (e.g., four seconds) after the noted reference time, and outputs the accumulated events upon expiration of the N-second period. The operator 311a then repeats accumulating and outputting events at the intervals of M seconds (M may be equal to N).

Query programs may be created by using the Event Processing Language (EPL). For example, the query program for the illustrated query 311 may be "select*from InputStream.win: time_batch(4 sec)". This query program includes two operators, "select*from InputStream" and "win: time_batch(4 sec)". The latter operator "win: time_batch(4 sec)" denotes that it fires at four-second intervals after the first arrival of an event. The former operator "select*from InputStream" denotes selecting and outputting the events that have arrived at an instance of this query program.

In connection with the time-base operators described above, the term "arrival time" may be defined as the time point at which a query receives an event for the first time after the query is invoked on the basis of a query program. Also, the term "firing time" may be defined as the time point at which the query outputs accumulated events. The term "standby time" may be defined as the period from the arrival time to the first firing. The term "firing interval" may be defined as the interval between two successive firing times (i.e., the cycle period of firing for the second time and later).

The query 311 is deployed in an engine node 300, and a corresponding state storage unit 311b is provided in the same. This state storage unit 311b is to store information about internal states of the query 311. Specifically, the internal states include a collection of events pending in the query 311 with respect to its operator 311a. The internal states also include information about the data range currently assigned to the query 311, out of those assigned to queries 311, 312, and 313.

For example, the query 311 receives an event with an identifier Ev#1 (referred to as "event Ev#1") as its first event after the invocation. The query 311 further receives two events Ev#2 and Ev#3 in the period of N seconds after the reception of event Ev#1. Events Ev#1, Ev#2, and Ev#3 fall into a data range that the query 311 is supposed to undertake, which is a subset of the whole data range of events that the preceding query 310 outputs. The query 311 accumulates the received events Ev#1, Ev#2, and Ev#3 in the state storage unit 311b during that period. The operator 311a fires when N seconds have passed since the arrival of event Ev#1. This firing of the operator 311a causes the query 311 to transmit events Ev#1, Ev#2, and Ev#3 from the state storage unit 311b to the next query 314.

The next part of the description will discuss how to implement time-base operators.

FIG. 7 illustrates an exemplary implementation of a time-base operator. The engine node 300 includes an engine 320 to control one or more queries running thereon. Every engine node, whether it is a physical machine or virtual machine, executes one engine. As will be described below, the illustrated engine 320 has a timer function for controlling when to fire the operator 311a.

(S1) Event Ev#1 arrives at the query 311. This is the first event that the query 311 encounters.

(S2) Upon arrival of even Ev#1, the operator 311a sends a timer request to the engine 320. This timer request requests the issuance of a timer notice to the operator 311a to specify the time of firing. The timer request may contain information about the arrival time and standby time of event Ev#1. The timer request may also specify a firing interval in the case where it requests repetitive issuance of timer notices. The query 311 accumulates incoming events from the preceding query 310, until the operator 311a receives a timer notice from the engine 320.

(S3) The engine 320 calculates a first firing time (i.e., when to fire a timer notice in the first place) from the arrival time and standby time specified in the received timer request. Normally this first firing time is obtained by adding standby time to arrival time. When the calculated firing time is reached, the engine 320 issues a timer notice to the operator 311a. Since the operator 311a is an event-driven processing entity, this timer notice can be implemented as a kind of event. In the case where the timer request specifies a firing interval, the engine 320 repetitively issues timer notices to the operator 311a at the specified firing intervals.

(S4) The receipt of a timer notice from the engine 320 tells the operator 311a that the right time for firing has come. When it is the initial timer notice, the query 311 outputs accumulated events, including event EV#1 and succeeding ones, to the next query 314. When it is the second timer notice, the query 311 outputs to the next query 314 events accumulated since the last timer notice.

The timer request produced by the operator 311a may include a value specifying a firing limit count. When this is the case, the engine 320 is allowed to issue as many timer notices as the firing limit count at most. The issuance of those timer notices may be stopped if there is a user's command for shutting down the query 311.

Figure 8:
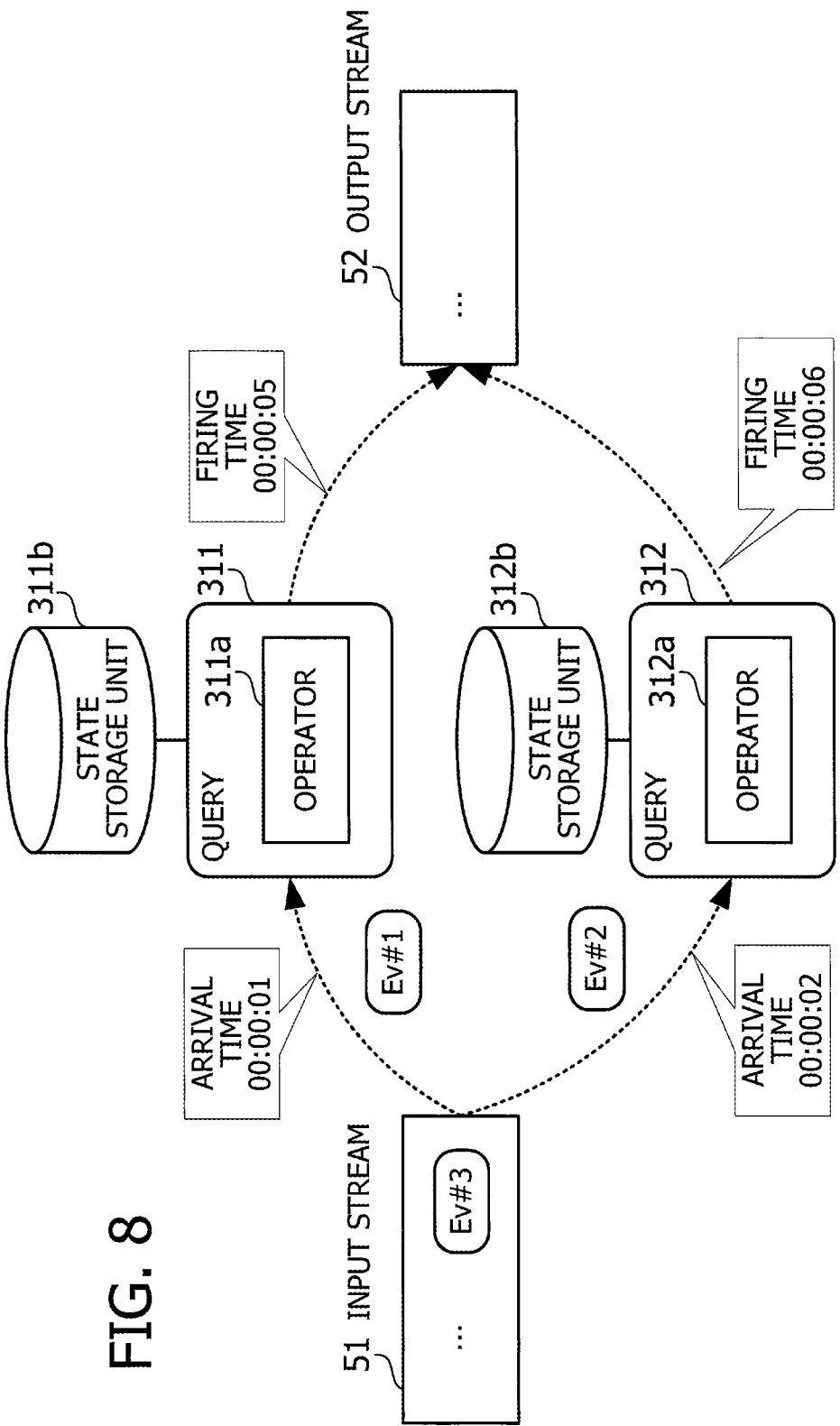
FIG. 8 illustrates an example of how the parallelized queries issue their respective timer notices.
Figure 11:
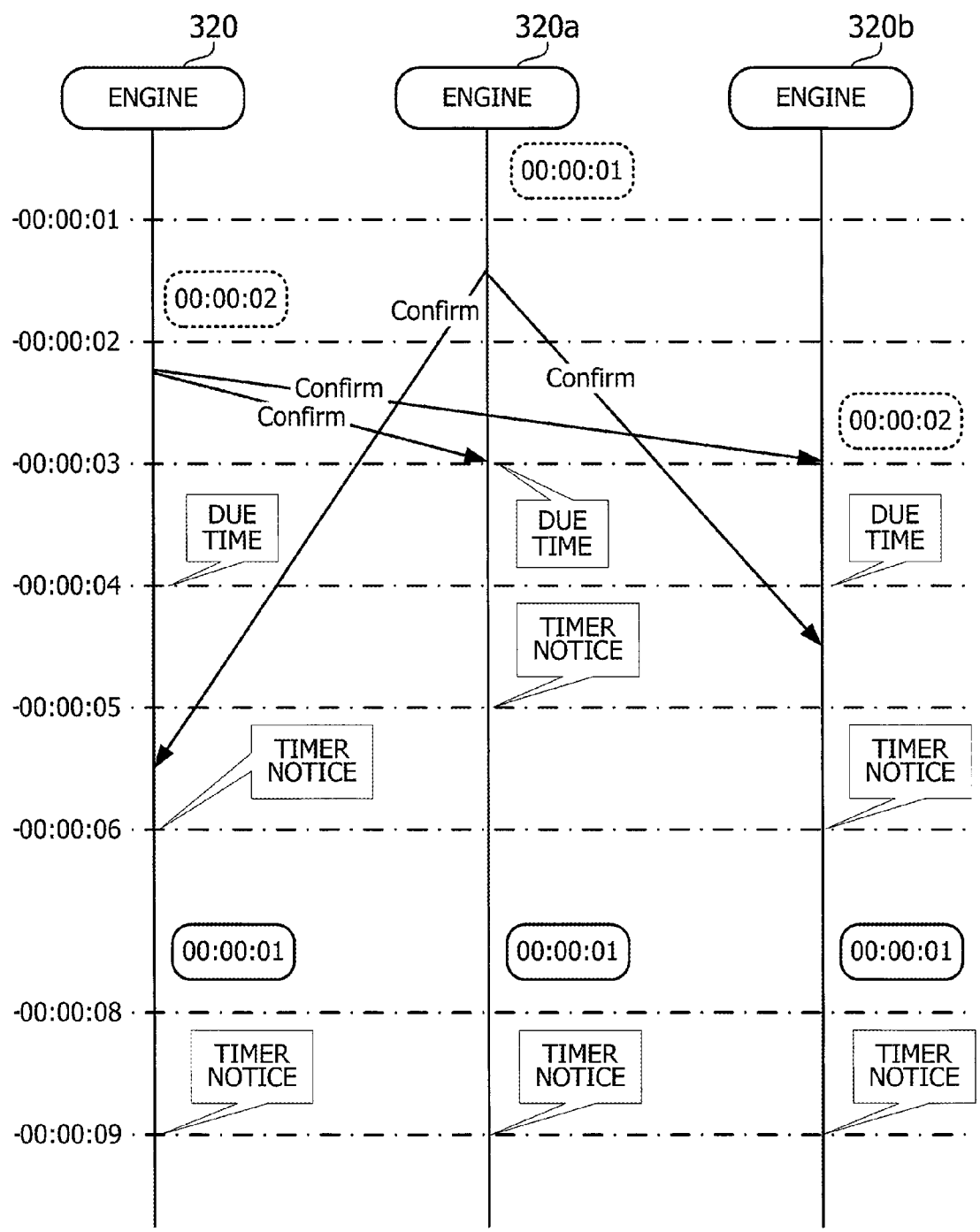
FIG. 11 illustrates an example of a tentative timer notice issued when a due time is reached.

Referring next to FIGS. 8 and 11, the following description will explain a procedure for unifying arrival times.

FIG. 8 illustrates an example of how the parallelized queries issue their respective timer notices. The illustrated system includes an input stream 51 and an output stream 52. The input stream 51 is a virtual input channel that supplies output events of a preceding query 310 to subsequent queries 311, 312, and 313. The output stream 52 is a virtual output channel that supplies output events of the queries 311, 312, and 313 to their subsequent query 314. The input stream 51 and output stream 52 are constructed by the engines in the engine nodes 300, 300a, and 300b. Queries 311 and 312 have only to see the input stream 51 and output stream 52, without the need for considering their preceding and succeeding queries per se.

As discussed previously, the engine node 300a includes a query 312 and a state storage unit 312b, and the query 312 includes an operator 312a, similarly to the query 311 in the engine node 300. The queries 311 and 312 have been invoked from a single query program so as to run in parallel to manipulate different events received from the input stream 51.

The two operators 311a and 312a may, however, recognize different arrival times of events, and that difference would lead to unequal firing times of the operators 311a and 312a. Suppose, for example, that one query 311 receives event Ev#1 at 00:00:01 while the other query 312 receives event Ev#2 at 00:00:02.

In the above case, one operator 311a recognizes an arrival time of 00:00:01 and thus schedules its first firing to be done at 00:00:05, assuming that the standby time is set to four seconds. Accordingly the query 311 accumulates incoming events during a period from 00:00:01 to 00:00:05 and outputs them into the output stream 52 at 00:00:05. The other operator 312a recognizes an arrival time of 00:00:02 and thus schedules its first firing to be done at 00:00:06. Accordingly, the query 312 accumulates incoming events during a period from 00:00:02 to 00:00:06 and outputs them into the output stream 52 at 00:00:06.

The above-described behavior of the queries 311 and 312 is different from the one without query parallelization, and it is also not the way the query program is supposed to do. Without query parallelization, a single query recognizes an arrival time of 00:00:01 for event Ev#1 and thus outputs only the events received in the period from 00:00:01 to 00:00:05 to the output stream 52. An example of parallel execution of a query program with time-base operators has been discussed above in comparison with the case of non-parallel execution of the same. The example demonstrates that this kind of query program would lead to a different processing result if it is simply parallelized on different engine nodes.

To correct the above, the distributed system of the second embodiment is designed to unify arrival times among different engine nodes 300, 300a, and 300b so as to calculate firing times based on a common reference time. The term "earliest arrival time" will now be used below to refer to the time at which an event arrives at queries 311, 312, and 313 as their first-time encounter with events (as in event Ev#1 in the example discussed above).

Figure 9:
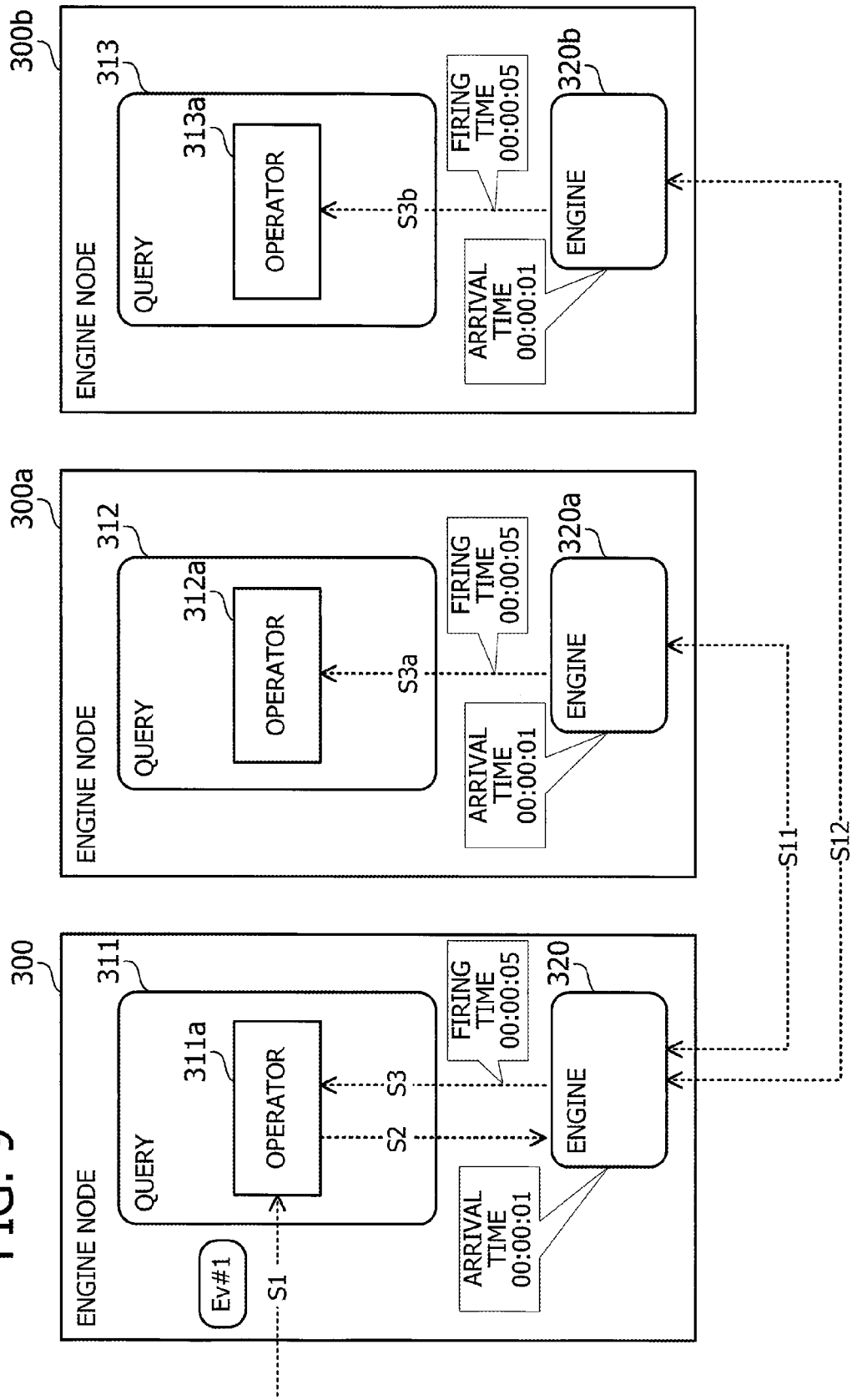
FIG. 9 illustrates an example of arrival time unification.

FIG. 9 illustrates an example of arrival time unification. Similarly to the first engine node 300 with an engine 320, the second engine node 300a and third engine node 300b have their respective engines 320a and 320b. An operator 313a is included in a query 313, just as other operators 311a and 312a are included in other queries. The three engine nodes 300, 300a, and 300b manage their local timebase devices so as to keep their real-time clocks synchronous with each other.

When one event Ev#1 arrives at the query 311 (S1), its operator 311a sends a timer request to the engine 320 (S2). Suppose that this timer request specifies an arrival time of 00:00:01. In response, the engine 320 transmits a piece of information to the second and third engine nodes 300a and 300b to indicate the arrival time perceived by the query 311. Based on this arrival time information, the second and third engine nodes 300a and 300b determine the earliest arrival time as a reference time for calculation of their firing times (S11, S12). Here the time 00:00:01 is determined as the earliest arrival time if the queries 312 and 313 have not received any events.

As a result of the above steps, the three engines 320, 320a, and 320b now share the value of 00:00:01 as the earliest arrival time for their queries 311, 312, and 313 of the same group. This common earliest arrival time enables the engines 320, 320a, and 320b to manage their firing times independently of each other. Specifically, the first engine 320 calculates its first firing time 00:00:05 from the earliest arrival time 00:00:01 and issues a timer notice to the operator 311a at that firing time (S3). The second engine 320a similarly calculates its first firing time from the earliest arrival time and issues a timer notice to the operator 312a at that firing time (S3a). The third engine 320b also calculates its first firing time from the earliest arrival time and issues a timer notice to the operator 313a at that firing time (S3b).

As can be seen from the above, the engines 320, 320a, and 320b determine a single earliest arrival time for a plurality of queries of the same group in response to a timer request from a time-base operator. This feature of the engines 320, 320a, and 320b enables their time-base operators to synchronize the issuance of timer notices.

Figure 10:
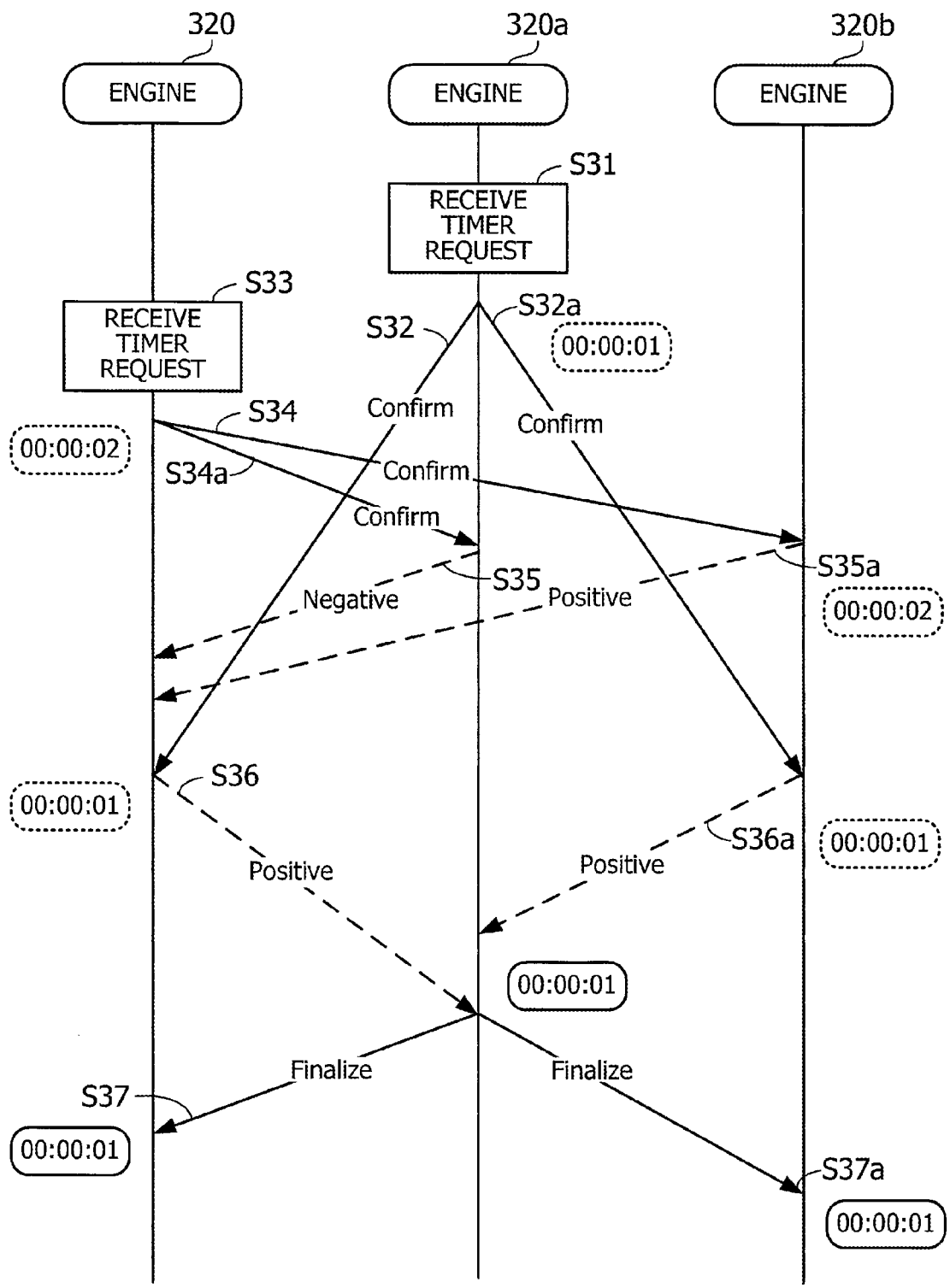
FIG. 10 illustrates a finalization procedure for establishing the earliest arrival time.

Two or more of the queries 311, 312, and 313 may receive events nearly at the same time. In that case, their corresponding engines 320, 320a, and 320b exchange information about the arrival times perceived by the queries and establish the earliest arrival time through a specific finalization procedure. Referring to FIGS. 10 and 11, the next part provides details of this finalization procedure for the earliest arrival time.

FIG. 10 illustrates a finalization procedure for establishing the earliest arrival time.

(S31) The second engine 320a receives a timer request from an operator 312a in the query 312. This timer request specifies an arrival time of 00:00:01. Upon receipt, the second engine 320a tentatively registers the value of 00:00:01 as a candidate for the earliest arrival time for the group of queries 311, 312, and 313. This tentative arrival time is subject to updates.

(S32, S32a) The second engine 320a then transmits a confirmation notice to other two engines 320 and 320b to confirm that its tentative arrival time 00:00:01 is really the earliest. This confirmation notice contains the arrival time value of 00:00:01.

(S33) The first engine 320, on the other hand, receives a timer request from an operator 311a in the query 311. This timer request specifies an arrival time of 00:00:02. The first engine 320 tentatively registers the value of 00:00:02 as another candidate for the earliest arrival time for the group of queries 311, 312, and 313. This tentative arrival time is subject to updates.

(S34, S34a) The first engine 320 transmits a confirmation notice to other two engines 320a and 320b to confirm that its tentative arrival time 00:00:02 is really the earliest. This confirmation notice contains the arrival time value of 00:00:02.

(S35) The second engine 320a receives a confirmation notice from the first engine 320. Upon receipt, the second engine 320a determines whether the arrival time specified in the received confirmation notice is earlier (smaller in value) than its own tentative arrival time. If the confirmation notice indicates an earlier arrival time than the tentative arrival time, or when there is no tentative registration of arrival times, the second engine 320a returns a positive notice and registers the specified arrival time as its new tentative arrival time. Otherwise, i.e., if the confirmation notice indicates an arrival time that is later (larger in value) or equal to the tentative arrival time, the second engine 320a returns a negative notice. In the present context, the second engine 320a transmits a negative notice back to the first engine 320 because the received confirmation notice indicates a later arrival time 00:00:02 than the tentative arrival time 00:00:01 in the second engine 320a.

(S35a) The third engine 320b also receives a confirmation notice from the first engine 320. Upon receipt, the third engine 320b compares the arrival time specified in the received confirmation notice with its own tentative arrival time, as similarly done by the second engine 320a. The third engine 320b in the present example has no such registered tentative arrival time. Accordingly, the third engine 320b registers the specified arrival time 00:00:02 as its tentative arrival time and transmits a positive notice back to the first engine 320.

The first engine 320 thus receives a positive notice or a negative notice from other two engines 320a and 320b as their responses to the confirmation notice. When all responses are done, the first engine 320 determines whether any of the received responses is a negative notice. If a negative notice is found, it means that some other query of the same group has received an event earlier than the query 311, and the first engine 320 turns down the arrival time of its query 311 as being not the earliest. If, on the other hand, no negative notice is present (i.e., the first engine 320 has only received positive notices), the first engine 320 selects its tentative arrival time as the earliest arrival time. In the present example, the first engine 320 rejects the arrival time of the query 311 since it has received a negative notice from the second engine 320a.

(S36) The first engine 320 receives a confirmation notice from the second engine 320a. The received confirmation notice specifies an arrival time of 00:00:01, which is earlier than the tentative arrival time 00:00:02 registered in the first engine 320. Accordingly, the first engine 320 updates its tentative arrival time to 00:00:01 and transmits a positive notice back to the second engine 320a.

(S36a) The third engine 320b also receives a confirmation notice from the second engine 320a. The received confirmation notice specifies an arrival time of 00:00:01, which is earlier than the tentative arrival time 00:00:02 registered in the third engine 320b. Accordingly, the third engine 320b updates its tentative arrival time to 00:00:01 and transmits a positive notice back to the second engine 320a.

(S37, S37a) The second engine 320a receives a positive notice from both the first and third engines 320 and 320b. Thus the second engine 320a determines its tentative arrival time 00:00:01 as the earliest arrival time (i.e., finalizes the tentative registration) and transmits a finalization notice to the first and third engines 320 and 320b. Upon receipt of this finalization notice, the first and third engines 320 and 320b finalize their tentative arrival times 00:00:01, thus establishing the earliest arrival time.

In the way described above, a finalization procedure takes place to objectively determine the earliest arrival time in the case where two or more queries of the same group receive events nearly at the same time.

The above finalization procedure is, however, accompanied by a communication overhead. For this reason, the engines 320, 320a, and 320b may not be able to finish their finalization procedure before the initial timer notice is issued, when a short standby time is specified by time-base operators (i.e., when the operators need the first firing shortly after the arrival time). To address this problem, each engine 320, 320a, and 320b is configured to issue a tentative initial timer notice, assuming that its currently registered tentative arrival time is valid as the earliest arrival time, in the case where the finalization procedure is not finished by a specific "due time."

Here the term "due time" denotes a time limit for determination of whether to use a tentative arrival time as a reference time for issuing an initial timer notice. For example, this due time may be set at a tentative firing time calculated from the currently registered tentative arrival time (e.g., by adding a standby time to the tentative arrival time). The due time may be earlier than the tentative firing time by a "minimum due time".

The above "minimum due time" provides the engines 320, 320a, and 320b with a sufficient time for preparation before issuing an initial timer notice, thus ensuring a certain level of accuracy in their issuance timing control. The minimum due time may be a predetermined constant value, or it may be a time calculated on the basis of an overhead of communication between the engines 320, 320a, and 320b. Subsequent to a confirmation notice specifying an arrival time from one engine to another engine, a positive notice and a finalization notice are communicated between these two engines to establish the specified arrival time as the earliest one. If the expected round-trip time of this communication is greater than the difference from the current time to the tentative firing time, it would not be possible to establish the earliest arrival time before the tentative firing time comes. In other words, one option for the minimum due time is to make it equal to the expected round-trip time for communication with the source engine of the confirmation notice.

FIG. 11 illustrates an example of a tentative timer notice issued when a due time is reached. FIG. 11 assumes that the standby time has a value of four seconds while the minimum due time is set to two seconds. This means that the tentative firing time of a query is four seconds after its registered tentative arrival time, and the due time is two seconds before the tentative firing time (or two seconds after the tentative arrival time).

The first engine 320 receives a timer request specifying an arrival time of 00:00:02 from an operator 311a in the query 311. Upon receipt, the first engine 320 tentatively registers the specified arrival time 00:00:02 and transmits a confirmation notice to other two engines 320a and 320b. On the other hand, the second engine 320a receives a timer request specifying an arrival time of 00:00:01 from an operator 312a in the query 312. Upon receipt, the second engine 320a tentatively registers the specified arrival time 00:00:01 and transmits a confirmation notice to other engines 320 and 320b.

The first confirmation notice sent by the first engine 320 arrives at each destination engine 320a and 320b some time before 00:00:03. On the other hand, the second confirmation notice sent by the second engine 320a arrives at each destination engine 320 and 302b some time after 00:00:04. The first and third engines 320 and 320b in this situation initially register the time 00:00:02 as their tentative arrival time, and their due time will be 00:00:04. In contrast, the second engine 320a initially registers the time 00:00:01 as its tentative arrival time, and its due time will be 00:00:03.

Neither of the three engines 320, 320a, and 320b is able to finalize the earliest arrival time before their respective due times. Accordingly, the first and third engines 320 and 320b determine at the moment of their due time 00:00:04 to issue an initial timer notice at a tentative firing time 00:00:06 determined from their current tentative arrival time. The second engine 320a determines at the moment of its due time 00:00:03 to issue an initial timer notice at a tentative firing time 00:00:05 determined from its current tentative arrival time. The resulting initial timer notices from those engines 320, 320a, and 320b are not synchronous with each other because of the failed finalization of earliest arrival times.

The engines 320, 320a, and 320b still pursue a finalization procedure as discussed in FIG. 10, in parallel with the issuance of initial timer notices. The finalization procedure establishes the earliest arrival time as 00:00:01 after the issuance of initial timer notices, thus permitting the engines 320 and 320a, and 320b to issue their second and subsequent timer notices on the basis of the established earliest arrival time. Specifically, their second timer notices are all issued at 00:00:09, assuming that the firing interval (issuance interval of the second and subsequent timer notices) is set to four seconds.

As seen from the above example, the engines 320, 320a, and 320b are designed to issue initial timer notices tentatively with reference to their respective tentative arrival times in the case where they are unable to establish the earliest arrival time by their due times. This feature ensures the issuance of initial timer notices. The finalization procedure is then finished, and the established earliest arrival time permits the engines 320, 320a, and 320b to issue second and subsequent simultaneously.

Although a finalization procedure may violate its due time, that would only happen when the timer request specifies too small standby time. Therefore the time differences between initial timer notices from the engines 320, 320a, and 320b are expected to be sufficiently small.

The next part of the description will explain the functions implemented in each engine node 300, 300a, and 300b.

Figure 12:
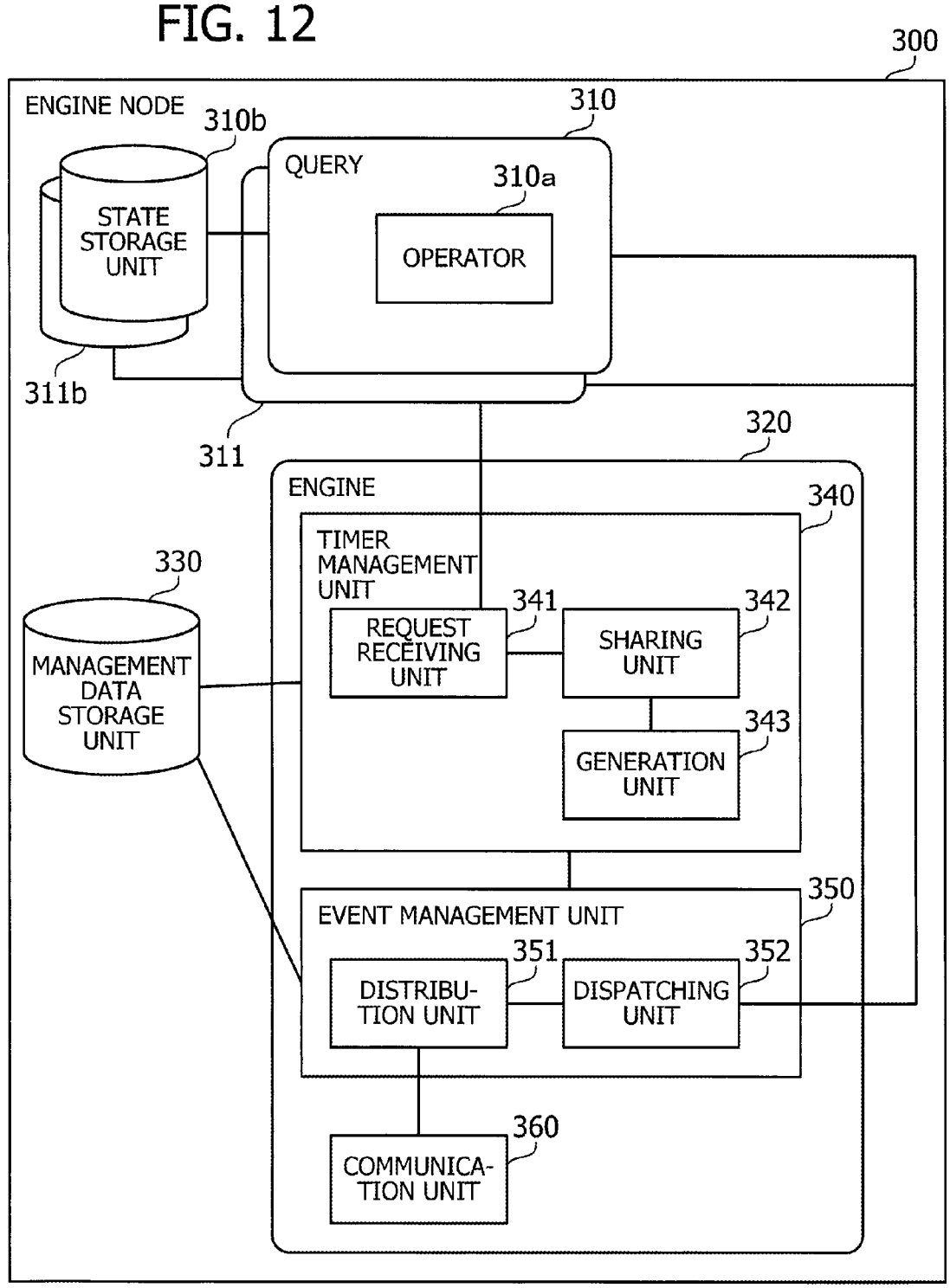
FIG. 12 is a block diagram illustrating an example of functions in an engine node.

FIG. 12 is a block diagram illustrating an example of functions in an engine node. The illustrated engine node 300 includes queries 310 and 311, state storage units 310b and 311b, an engine 320, and a management data storage unit 330. The engine 320 includes a timer management unit 340, an event management unit 350, and a communication unit 360. The engine 320 may be implemented as a program module that the processor 301 is to execute. The state storage units 310b and 311b and management data storage unit 330 may each be implemented as a storage space reserved in the RAM 302 or HDD 303. Other engine nodes 300a and 300b also have the same functions as the illustrated engine node 300.

One query 310 includes an operator 310a, which may be a time-base operator or of any other type. The other query 311 includes an operator 311a (not seen in FIG. 12).

A state storage unit 310b is provided together with the former query 310 to store its internal state information. This internal state information includes, among others, events that have temporarily been accumulated and a data range that the query 310 is supposed to undertake (e.g., a range of identifiers of events to be distributed to the query 310). Another state storage unit 311b is provided together with the latter query 311 to store its internal state information.

As illustrated, a plurality of queries may be placed in each engine node, and a state storage unit is provided for each such query to store its internal state information. Every engine node has one engine to manage a plurality of queries and state storage units in that node.

The management data storage unit 330 contains a sharing management table, an event management table, and a routing table as part of management information. The sharing management table stores information about timer requests. The event management table stores information about timer notices. The routing table stores information about destinations of events.

The timer management unit 340 manages issuance of timer notices. Specifically, the timer management unit 340 includes a request receiving unit 341, a sharing unit 342, and a generation unit 343.

The request receiving unit 341 receives timer requests from time-base operators in each query located in the engine node 300 (e.g., operator 311a in a query 311). Timer requests contain information describing arrival time, standby time, firing interval, firing limit count, and the like.

The sharing unit 342 extracts information contained in each timer request received by the request receiving unit 341 and registers the extracted information in a sharing management table in the management data storage unit 330. Here the sharing unit 342 takes the arrival time specified in the timer request as a tentative arrival time and thus produces and transmits a confirmation notice for that tentative arrival time to other engine nodes 300a and 300b via the event management unit 350 and communication unit 360. The destinations of this confirmation notice are engine nodes that have queries of the same group as the sender of a timer request, and these node can be found by searching the routing table stored in the management data storage unit 330. The confirmation notice may, however, be broadcast to the network 31 or may be addressed to all the other engine nodes.

The sharing unit 342 receives a positive notice or a negative notice, as a response to the confirmation notice, from peer engine nodes 300a and 300b via the communication unit 360 and event management unit 350. Then, based on the received responses, the sharing unit 342 determines whether to establish its tentative arrival time as the earliest arrival time. When it is determined to establish the earliest arrival time, the sharing unit 342 changes the tentative arrival time to a final registration, and enters the values of first firing time, firing interval, firing limit count, and the like to an event management table stored in the management data storage unit 330. The sharing unit 342 then transmits a finalization notice to the peer engine nodes 300a and 300b.

The sharing unit 342 also receives a confirmation notice via the communication unit 360 and event management unit 350. Upon receipt, the sharing unit 342 compares an arrival time specified in the confirmation notice with the tentative arrival time of the engine node 300. If the former time is earlier (smaller in value) than the latter, the sharing unit 342 returns a positive notice, while updating the tentative arrival time with the one specified in the confirmation notice. Otherwise, the sharing unit 342 returns a negative notice. The sharing unit 342 further receives a finalization notice via the communication unit 360 and event management unit 350. This finalization notice permits the sharing unit 342 to change the tentative arrival time to a final registration and enters the values of first firing time, firing interval, firing limit count and the like into the event management table.

The sharing unit 342 may hit the due time before being able to establish a final registration of arrival time. In that case, the sharing unit 342 tentatively registers a first firing time, firing interval, firing limit count, and the like in the event management table, so that an initial timer notice can be issued. In other respects, the sharing unit 342 may accept a change or deletion of timer requests from local time-base operators. In that case, the sharing unit 342 reflects the change or deletion in its sharing management table, event management table, and the like.

The generation unit 343 produces a timer notice at an appropriate time with reference to the event management table stored in the management data storage unit 330 and outputs it to the event management unit 350.

The event management unit 350 manages distribution of events between the engine 320 and queries on the engine node 300, as well as between engine nodes. The event management unit 350 includes a distribution unit 351 and a dispatching unit 352.

The distribution unit 351 receives a timer notice, as a kind of event, from the timer management unit 340. The distribution unit 351 then searches the routing table stored in the management data storage unit 330 and determines to which time-base operator the timer notice is addressed. The distribution unit 351 may also receive various event control notices (e.g., confirmation notice, positive notice, negative notice, finalization notice) from the timer management unit 340. These things are also events. Upon receipt of an event control notice, the distribution unit 351 determines its destination engine node(s) by consulting the routing table and passes the event control notice to the communication unit 360. The distribution unit 351 may also receive event control notices from the communication unit 360 and pass them to the timer management unit 340.

The distribution unit 351 controls distribution of events as data (data events) that is exchanged among queries 310 to 314. Upon receipt of a data event from the communication unit 360, the distribution unit 351 determines to which queries the event has to go, with reference to the routing table, as well as consulting the current assignment of data ranges recorded in the state storage units 310b and 311b. The distribution unit 351 may also receive data events from queries 310 and 311. In that case, the distribution unit 351 consults the routing table to determine their destination engine nodes and passes those events to the communication unit 360.

The dispatching unit 352 passes events to their destination queries or time-base operators when the destinations determined by the distribution unit 351 exists in the engine node 300 itself.

The communication unit 360 communicates with other engine nodes 300a and 300b over the network 31. Specifically the communication unit 360 receives event control notices and data events from the event management unit 350 and transmits them to engine nodes specified by the event management unit 350. The communication unit 360 also receives event control notices and data events from other engine nodes 300a and 300b and passes them to the event management unit 350.

FIG. 13 illustrates an example of a sharing management table. The sharing management table 331 is a collection of information about timer requests and stored in the management data storage unit 330. Specifically the illustrated sharing management table 331 is formed from the following data fields: query name, operator name, arrival time, standby time, firing interval, firing limit count, minimum due time, and registration status.

The query name field contains an identifier that indicates what type of query has transmitted a particular timer request of interest. Query names are, in other words, the identifiers of individual query programs. A single query name is assigned to two or more queries of the same group, indicating that they are invoked from a single query program. The operator name field contains an identifier that indicates what kind of operator has transmitted the timer request of interest. Operator names are, in other words, the identifiers of individual operators contained in a query program. A single operator name is assigned to two or more operators of the same type contained in queries of the same group.

The arrival time field contains an arrival time specified in the timer request of interest. This arrival time indicates when an event arrived for the first time at the source query of the timer request of interest. The standby time field contains a standby time specified in the timer request. The firing interval field contains a firing interval specified in the timer request, which indicates at what intervals the second and subsequent timer notices are to be issued. The firing limit count field contains an upper limit of firing that is specified in the timer request, which indicates how many timer notices are allowed to be issued at most. Operators, if they are of the same type, specify the same standby time, firing interval, and firing limit count since these parameters are described in their source query program. Note that the timer request of interest may lack the firing interval or firing limit count in the case where its source time-base operator requests the issuance of a single timer notice.

The minimum due time field contains a minimum due time used to calculate a due time. Give a value of zero to this minimum due time field, and the due time is set to the first firing time. Give a positive constant to the minimum due time field, and the minimum due time is fixed to that value. Give a variable to the minimum due time field, and the minimum due time can be varied depending on the communication condition or the like. For example, the sharing unit 342 calculates a difference between the reception time of a positive notice from another engine node and the arrival time specified in the confirmation notice. This difference is called "notification delay time," and the sharing unit 342 determines a minimum due time to be double the notification delay time. Note that the minimum due time is not allowed to exceed the standby time.

The registration status field indicates the status of the arrival time, tentative or final. The value "tentative" indicates that the earliest arrival time is pending, whereas the value "final" indicates that the earliest arrival time has been established.

FIG. 14 illustrates an example of an event management table. The event management table 332 is a collection of information about timer notices and stored in the management data storage unit 330. Specifically, the illustrated event management table 332 is formed from the following data fields: query name, operator name, first firing time, firing interval, firing limit count, firing count, and registration status.

The query name, operator name, firing interval, and firing limit count fields are copied from their respective counterparts in the sharing management table 331. The first firing time field contains a first firing time calculated from the earliest arrival time and the standby time. The firing count field contains a counter representing how many times the generation unit 343 has produced a timer notice. The generation unit 343 produces a timer notice repetitively at the firing intervals until the firing limit count is reached.

The registration status field indicates the status of the first firing time. This field contains a value of "tentative" to indicate that an initial timer notice is issued on a tentative basis because the due time has passed without successful establishment of the earliest arrival time. Otherwise, the registration status field contains a value of "final" to indicate that the earliest arrival time is established.

FIG. 15 illustrates an example of a routing table. The routing table 333 is a collection of information about the destinations of events and stored in the management data storage unit 330. Specifically, the illustrated routing table 333 is formed from the following data fields: event name, query name, operator name, and node name.

The event name field contains an identifier that indicates the type of an event. There are several types of events that queries 310 to 314 exchange with each other, which include data, timer notices, and event control notices. In the example of FIG. 15, Event1 and Event2 represent data events, TimeEvent1 and TimeEvent2 represent timer notices, and TimeEvent_Ctl1 and TimeEvent_Ctl2 represent event control notices.

The query name field contains an identifier that indicates the type of a destination query of the event of interest. The operator name field contains an identifier that indicates the type of a destination operator of the event of interest. The node name field contains an identifier that indicates an engine node in which the destination query is located. Two or more node names may be registered in this field, meaning that multiple queries belonging to the same group reside in those engine nodes. Note that the routing table 333 in FIG. 15 contains a value of "Local" in the node name field for timer notice events since the engine 320 never sends a timer notice directly to other engine nodes.

FIG. 16 illustrates an example of a timer request. Timebase operators such as an operator 311a transmit a timer request 61 to their corresponding timer management unit 340. The illustrated timer request 61 is formed from the following data fields: query name, operator name, arrival time, standby time, firing interval, and firing limit count.

The data fields of query name, operator name, arrival time, standby time, firing interval, and firing limit count are equivalent to their counterparts in the foregoing sharing management table 331. The query name and operator name seen in the timer request 61 indicate the sender of the timer request 61. The arrival time specified in the timer request 61 indicates at what time the first event arrived at the noted sender.

FIG. 17 illustrates an example of an event control notice. This event control notice 62 is transmitted among the engine nodes 300, 300a, and 300b in the course of establishing the earliest arrival time. The illustrated event control notice 62 is formed from the following data fields: query name, operator name, source, control type, arrival time, standby time, firing interval, and firing limit count.

The data fields of query name, operator name, arrival time, standby time, firing interval, and firing limit count are equivalent to their counterparts tentatively registered in the foregoing sharing management table 331. The source field contains an identifier indicating the source engine node that has transmitted an event control notice 62. The control type field contains one of the values "Confirm," "Positive," "Negative," and "Finalize" to indicate the type of the event control notice 62.

Referring next to several flowcharts in FIGS. 18 to 21, the description will explain how to obtain a common arrival time. The following description assumes that the engine node 300 executes the processing operations seen in FIGS. 18 to 21. Other engine nodes 300a and 300b also execute the same processing operations in a similar way. Note that the procedures of FIGS. 18 to 21 are executed independently of each other.

Figure 18:
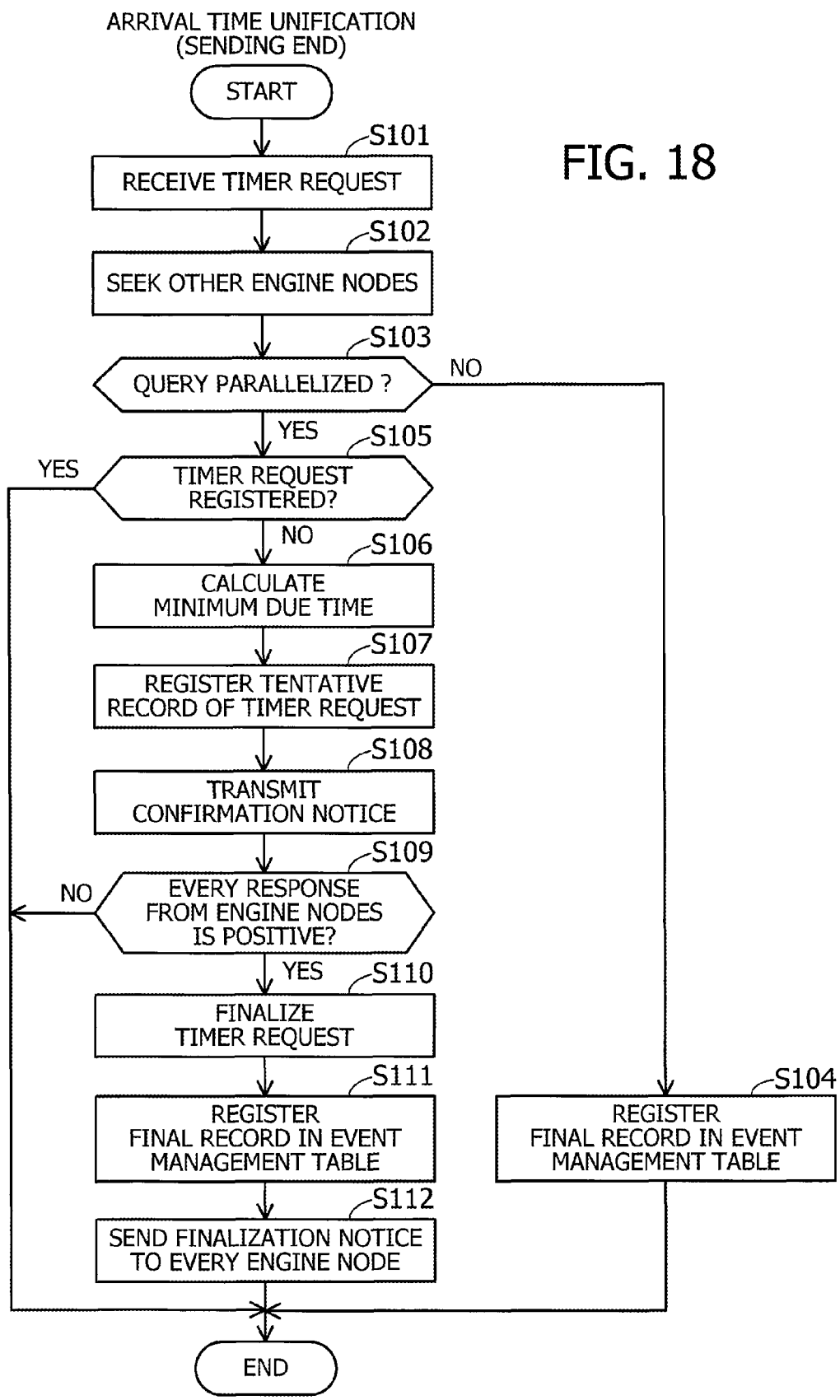
FIG. 18 is a flowchart illustrating an exemplary procedure performed at the sending end to unify arrival times.

FIG. 18 is a flowchart illustrating an exemplary procedure performed at the sending end to unify arrival times.

(S101) The request receiving unit 341 receives a timer request 61.

(S102) With reference to the routing table 333 stored in the management data storage unit 330, the sharing unit 342 seeks other engine nodes that host a query of the same group as the sending query of the timer request 61. For example, the sharing unit 342 searches the routing table 333 and extracts node names from its registered record that has an event name indicating event control notices (e.g., those having "_Ct1" in FIG. 15) and matches with the query name and operator name specified in the received timer request 61.

(S103) The sharing unit 342 determines whether the above step S102 has found any peer engine nodes. In other words, the sharing unit 342 determines whether the sending query of the timer request 61 is parallelized. When the sending query is parallelized, the procedure advances to step S105. Otherwise, the procedure proceeds to step S104.

(S104) The sharing unit 342 calculates a first firing time from the arrival time and standby time specified in the timer request 61. Specifically, this first firing time is obtained by adding the standby time to the arrival time. The sharing unit 342 then updates the event management table 332 in the management data storage unit 330 with a final registration record that contains the query name, operator name, firing interval, firing limit count specified by the timer request 61, together with the calculated first firing time. The procedure is then terminated.

(S105) The sharing unit 342 determines whether the sharing management table 331 in the management data storage unit 330 has a tentative or final registration record that contains both the query name and operator name specified by the timer request 61. If such a record is present, the sharing unit 342 discards the timer request 61 and terminates the procedure. If no such record is found, the procedure advances to step S106.

(S106) The sharing unit 342 calculates a minimum due time. This minimum due time may actually be a predefined constant or may be calculated on the basis of past records of communication times spent with the peer engine nodes found in step S102.

(S107) The sharing unit 342 updates the sharing management table 331 with a tentative registration record. This tentative record contains the query name, operator name, arrival time, standby time, firing interval, and firing limit count specified in the timer request 61, as well as the minimum due time calculated in step S106.

(S108) The sharing unit 342 produces an event control notice with a control type value of "Confirm" (i.e., a confirmation notice). This confirmation notice contains the query name, operator name, arrival time, standby time, firing interval, and firing limit count specified in the timer request 61, as well as the node name of the engine node 300. The sharing unit 342 transmits the confirmation notice to the peer engine nodes found in step S102, via the event management unit 350 and communication unit 360. Alternatively, this confirmation notice may be broadcast to all engine nodes.

(S109) The sharing unit 342 receives, via the communication unit 360 and event management unit 350, event control notices from other engine nodes to which the confirmation notice has been transmitted. Here the distribution unit 351 in the event management unit 350 is configured to, for example, obtain the identifier of each received event from the communication unit 360 and determine from this event identifier whether the received event is an event control notice. The distribution unit 351 thus passes such event control notices to the sharing unit 342, and the sharing unit 342 determines whether every received event control notice is a positive notice. When all the event control notices are positive ones, the procedure advances to step S110. When one or more negative notice is included, the procedure is terminated.

(S110) The sharing unit 342 searches the sharing management table 331 for a record that has the query name and operator name specified in the received positive notices. This search has to find the tentative registration record entered in step S107, and the sharing unit 342 changes its registration status from "Tentative" to "Final."

(S111) The sharing unit 342 calculates a first firing time from the arrival time and standby time described in the record of the sharing management table 331 that has just been finalized in step S110. Then the sharing unit 342 updates the event management table 332 by entering a final registration record that is formed from the query name, operator name, firing interval, and firing limit count stated in the above record of the sharing management table 331, together with the calculated first firing time. As will be described later, the event management table 332 may have a tentative registration record containing the noted query name, operator name, and the like. When that is the case, the sharing unit 342 has only to give a "Final" registration status to that tentative record.

(S112) The sharing unit 342 produces a finalization notice, i.e., an event control notice with a value of "Finalize" in its control type field. This finalization notice contains the query name, operator name, arrival time, standby time, firing interval, and firing limit count that step S110 has registered in the sharing management table 331 as a final record. The sharing unit 342 transmits the produced finalization notice to every engine node via the event management unit 350 and communication unit 360. Alternatively, this finalization notice may be broadcast to all engine nodes.

Figure 19:
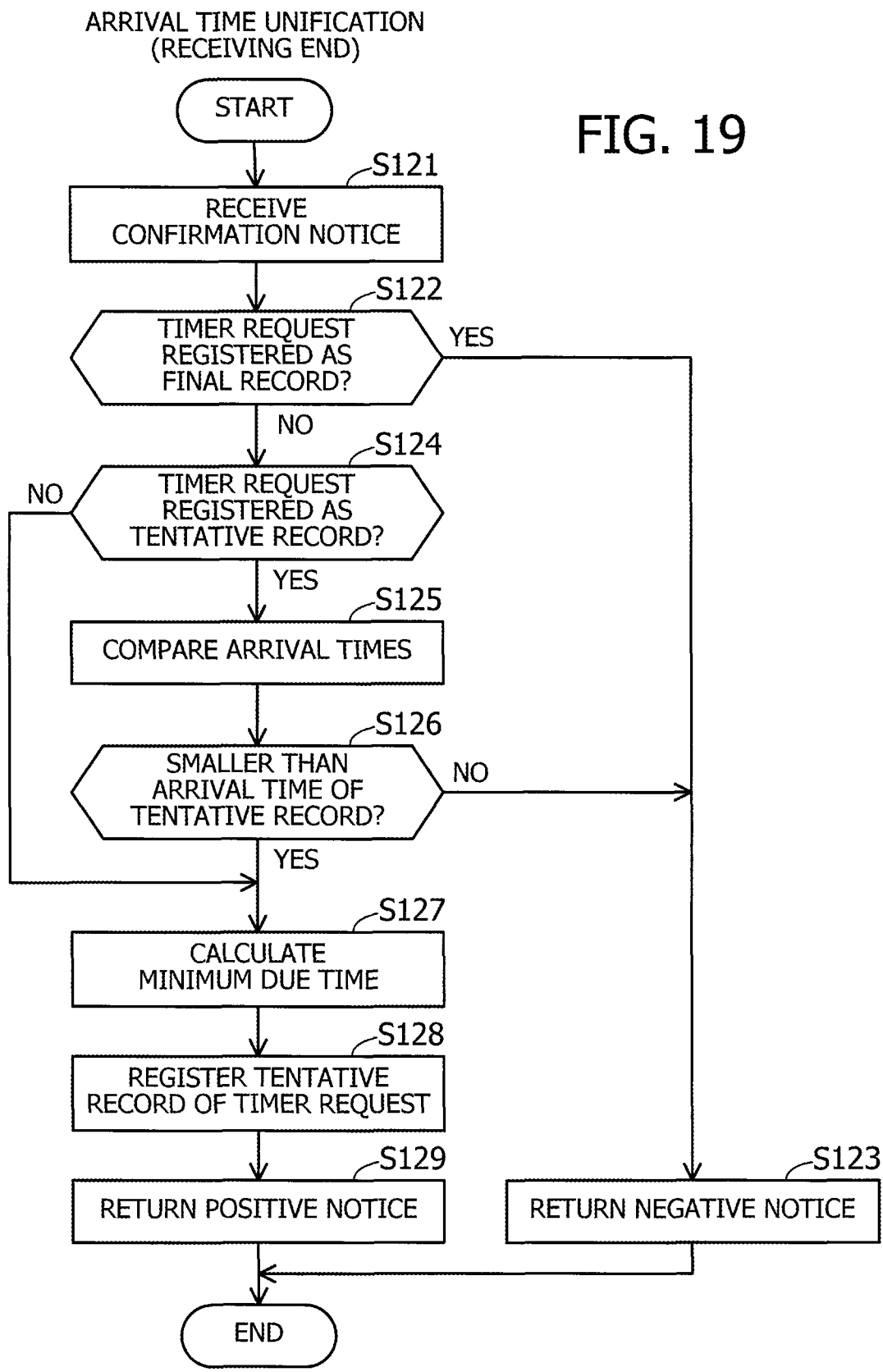
FIG. 19 is a flowchart illustrating an exemplary procedure performed at the receiving end to unify arrival times.

FIG. 19 is a flowchart illustrating an exemplary procedure performed at the receiving end to unify arrival times.

(S121) The sharing unit 342 receives a confirmation notice from another engine node via the communication unit 360 and event management unit 350. This confirmation notice is an event control notice having a value of "Confirm" in its control type field. Here the distribution unit 351 in the event management unit 350 is configured to, for example, obtain the identifier of a received event from the communication unit 360, determine from this event identifier whether the received event is an event control notice, and pass the event control notice to the sharing unit 342.

(S122) The sharing unit 342 determines whether the sharing management table 331 in the management data storage unit 330 has a final record that contains both the query name and operator name specified in the received confirmation notice. When such a final record is found, the procedure moves to step S123. When there is no such final record, the procedure advances to step S124. Note that the latter condition includes the case of no registrations and the case where a tentative record is registered.

(S123) The sharing unit 342 produces a negative notice, i.e., an event control notice with a value of "Negative" in its control type field. This negative notice contains the query name, operator name, arrival time, standby time, firing interval, and firing limit count specified in the received confirmation notice, as well as the node name of the engine node 300. The sharing unit 342 transmits the produced negative notice to the sending engine node of the confirmation notice via the event management unit 350 and communication unit 360. The procedure is then terminated.

(S124) The sharing unit 342 determines whether the sharing management table 331 has a tentative record that contains both the query name and operator name specified in the received confirmation notice. When such a tentative record is found, the procedure advances to step S125. When there is no such tentative record, the procedure skips to step S127.

(S125) The sharing unit 342 compares the arrival time specified in the confirmation notice with the tentative arrival time registered in the sharing management table 331.

(S126) The sharing unit 342 checks the result of the comparison in step S125. That is, the sharing unit 342 determines whether the arrival time specified in the confirmation notice is earlier (smaller in value) than the tentative arrival time registered in the sharing management table 331. If the former is earlier than the latter, the procedure advances to step S127. Otherwise (i.e., if the former is later (larger in value) than or equal to the latter), the procedure branches to step S123.

(S127) The sharing unit 342 calculates a minimum due time. The minimum due time may be fixed or variable. In the latter case, the sharing unit 342 calculates a minimum due time from, for example, the arrival time specified in the received confirmation notice and the reception time of that confirmation notice. Specifically, the minimum due time may be double the difference between the reception time and the arrival time. This time means a round-trip time in communication between the engine node 300 and the sender of the confirmation notice, and it is equivalent to how much time it takes for sending a positive notice and a finalization notice upon receipt of a confirmation notice. In other words, at least the minimum due time is needed for establishing the earliest arrival time.

(S128) The sharing unit 342 registers information about the received confirmation notice as a tentative record in the sharing management table 331. In the case where no tentative record has been found in step S124, the sharing unit 342 registers a tentative record in the sharing management table 331. This record contains the query name, operator name, arrival time, standby time, firing interval, and firing limit count specified in the received confirmation notice, as well as the minimum due time calculated in step S127. In the case where a tentative record has been found in step S124, the sharing unit 342 updates its tentatively registered arrival time field with the value specified in the confirmation notice, and its minimum due time field with the one calculated in step S127.

(S129) The sharing unit 342 produces a positive notice, i.e., an event control notice with a value of "Positive" in its control type field. This positive notice contains the query name, operator name, arrival time, standby time, firing interval, and firing limit count specified in the received confirmation notice, as well as the node name of the engine node 300. The sharing unit 342 transmits the produced positive notice to the sending engine node of the confirmation notice via the event management unit 350 and communication unit 360.

Figure 20:
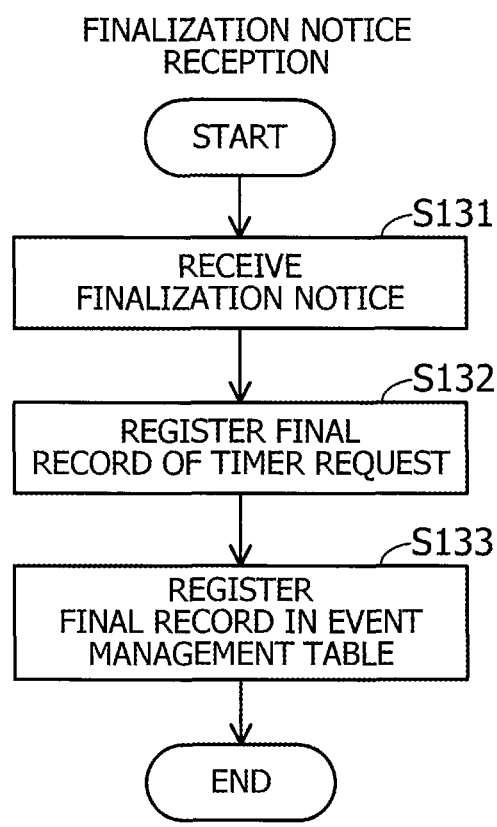
FIG. 20 is a flowchart illustrating an exemplary procedure of receiving a finalization notice.

FIG. 20 is a flowchart illustrating an exemplary procedure of receiving a finalization notice.

(S131) The sharing unit 342 receives a finalization notice from another engine node via the communication unit 360 and event management unit 350. This confirmation notice is an event control notice having a value of "Finalize" in its control type field. Here the distribution unit 351 in the event management unit 350 is configured to, for example, obtain the identifier of a received event from the communication unit 360, determine from this event identifier whether the received event is an event control notice, and pass the event control notice to the sharing unit 342.

(S132) The sharing unit 342 searches the sharing management table 331 in the management data storage unit 330 for a tentative record that contains both the query name and operator name specified in the received finalization notice. The sharing unit 342 then changes the found tentative record to a final record.

(S133) The sharing unit 342 calculates a first firing time from the arrival time and standby time finally registered in the sharing management table 331 in step S132. Then the sharing unit 342 updates the event management table 332 by entering a final record containing the query name, operator name, firing interval, and firing limit count that are registered in the final record of the sharing management table 331, together with the calculated first firing time. As will be described later, the event management table 332 may have a tentative registration record containing the noted query name, operator name, and the like. When that is the case, the sharing unit 342 has only to change that tentative record to a final record.

Figure 21:
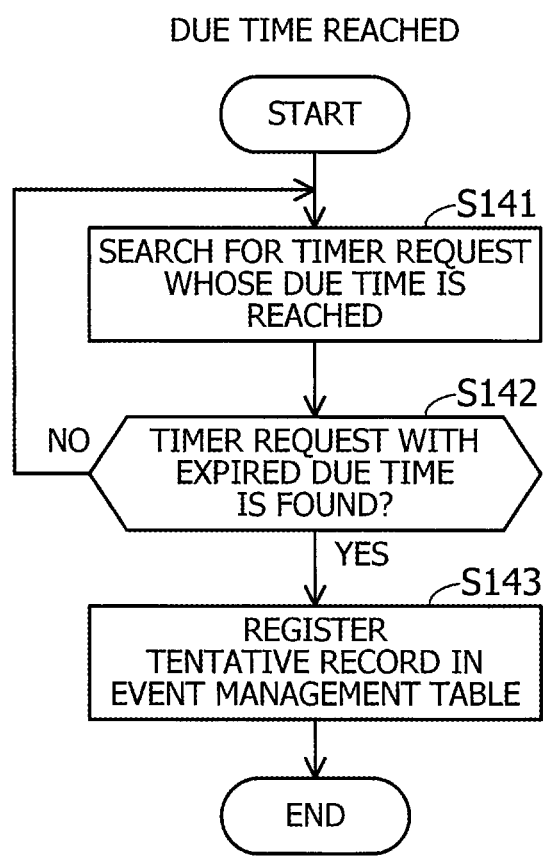
FIG. 21 is a flowchart illustrating an exemplary procedure performed when a due time is reached.

FIG. 21 is a flowchart illustrating an exemplary procedure performed when a due time is reached.

(S141) The sharing unit 342 checks the current time and searches the sharing management table 331 for a tentative record whose due time is reached. Due time is minimum due time before the first firing time, assuming that the tentative arrival time is used as a reference time. More specifically, due time is calculated by adding arrival time and standby time together and subtracting minimum due time.

(S142) The sharing unit 342 determines whether step S141 has found a tentative record whose due time is reached. If such a record is found, the procedure advances to step S143. If no such record is found, the process returns to step S141.

(S143) The sharing unit 342 calculates a tentative first firing time from the arrival time and standby time described in the tentative record in the sharing management table 331 that step S141 has found. Then the sharing unit 342 updates the event management table 332 by entering a tentative record that is formed from the query name, operator name, firing interval, and firing limit count registered in the tentative record of the sharing management table 331, together with the calculated first firing time. The generation unit 343 thus issues an initial timer notice on the basis of the tentative arrival time.

Figure 22:
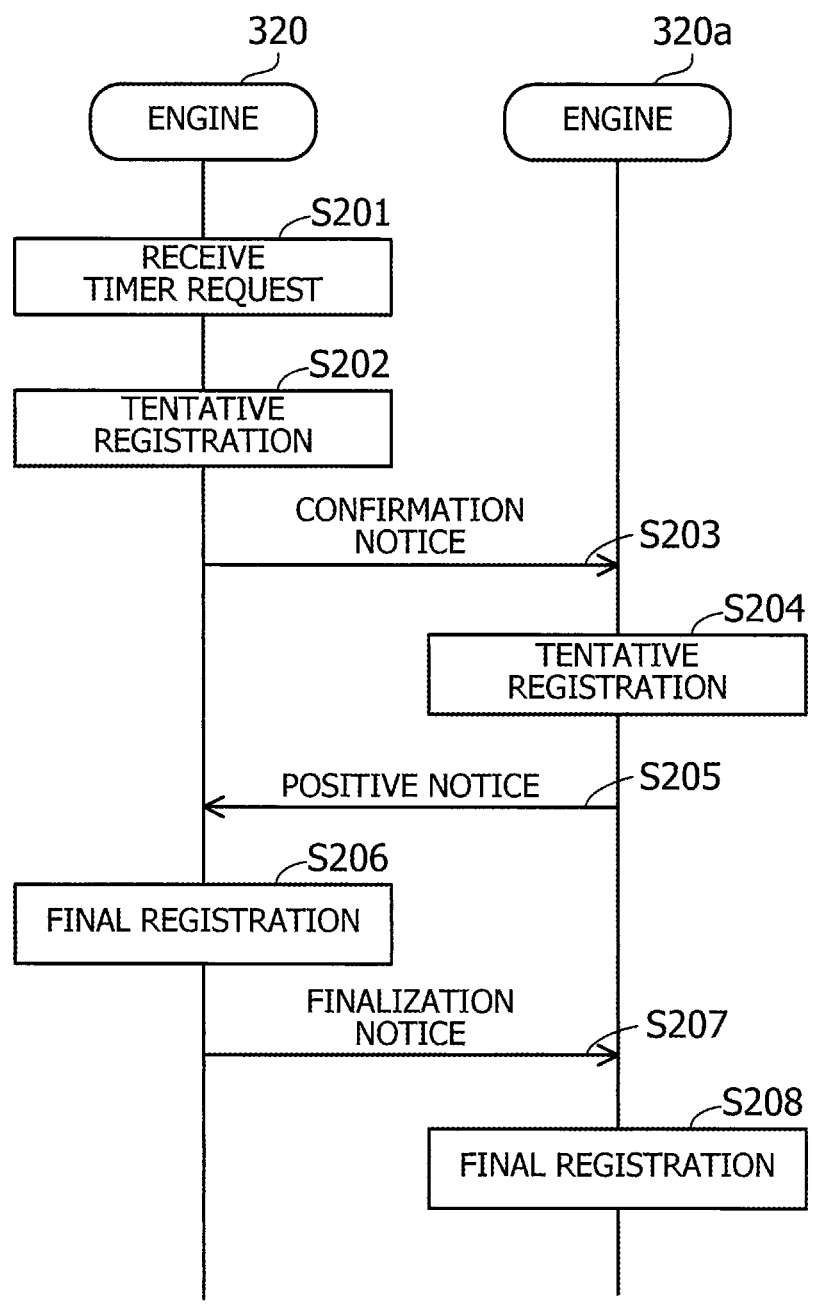
FIG. 22 illustrates an example of a sequence in which a confirmation notice is positively acknowledged.
Figure 23:
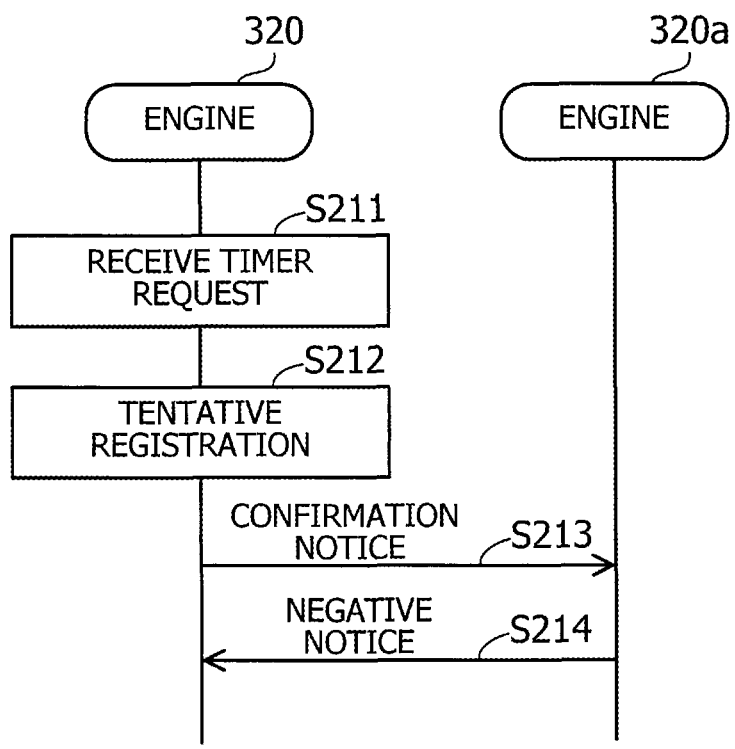
FIG. 23 illustrates an example of a sequence in which a confirmation notice is negatively acknowledged.

Referring next to FIGS. 22 and 23, the following description will present a pair of examples of a procedural sequence for establishing the earliest arrival time. Note that, in FIGS. 22 and 23, a confirmation notice is assumed to be sent from one engine node 300 and received by another engine node 300a.

FIG. 22 illustrates an example of a sequence in which a confirmation notice is positively acknowledged.

(S201) The first engine 320 receives a timer request 61 from an operator 311a (time-base operator) in a query 311.

(S202) The received timer request 61 specifies an arrival time and other values. The first engine 320 tentatively registers this arrival time and other values in the sharing management table 331 stored in the engine node 300.

(S203) The first engine 320 transmits a confirmation notice to the peer engine node 300a. This confirmation notice conveys the arrival time and other values that step S202 has tentatively registered in the sharing management table 331.

(S204) The second engine 320a compares the arrival time specified in the received confirmation notice with an arrival time, if any, in the sharing management table of the engine node 300a. It is assumed here that the sharing management table in the engine node 300a has no arrival times as to the operator 311a, or that the arrival time specified in the confirmation notice is earlier than an arrival time tentatively registered in the sharing management table of the engine node 300a. Accordingly, the engine 320a registers a tentative record of the earlier arrival time and the like in the sharing management table of the engine node 300a.

(S205) The second engine 320a transmits a positive notice back to the engine node 300.

(S206) The first engine 320 updates the sharing management table 331 of the engine node 300 by changing the registration status to "Final" for the tentative record of arrival time and other values registered in step S202.

(S207) The first engine 320 transmits a finalization notice to the peer engine node 300a.

(S208) The second engine 320a updates the sharing management table of the engine node 300a by changing the registration status to "Final" for the tentative record of arrival time and other values registered in step S204. This establishes the earliest arrival time that is common to the two engine nodes 300 and 300a.

FIG. 23 illustrates an example of a sequence in which a confirmation notice is negatively acknowledged.

(S211) The first engine 320 receives a timer request 61 from an operator 311a (time-base operator) in a query 311.

(S212) The received timer request 61 specifies an arrival time and other values. The engine 320 tentatively registers this arrival time and other values in the sharing management table 331 stored in the engine node 300.

(S213) The first engine 320 transmits a confirmation notice to the engine node 300a. This confirmation notice conveys the arrival time and other values that step S212 has tentatively registered in the sharing management table 331.

(S214) The second engine 320a compares the arrival time specified in the received confirmation notice with an arrival time, if any, in the sharing management table of the engine node 300a. It is assumed here that the arrival time specified in the received confirmation notice is later than or equal to an arrival time tentatively registered in the sharing management table of the engine node 300a. Accordingly, the second engine 320a transmits a negative notice to the peer engine node 300, without registering a tentative record of the arrival time and other values in the sharing management table of the engine node 300a. The arrival time specified by the operator 311a is not taken as a common earliest arrival time. Instead, an arrival time specified by some other operator will be used for the purpose.

The next description discusses the case in which the query 311 is copied or migrated from the engine node 300 to the engine node 300c.

FIG. 24 illustrates an example of management operations performed when a new engine node is added.

When the engine nodes 300, 300a, and 300b are found to be heavily loaded, their manager node 600 sets up a spare engine node 300c in preparation for deployment of queries. For example, the manager node 600 causes the engine node 300c to run an engine for the purpose of managing one or more queries.

The manager node 600 has a choice between copying a query 311 in the engine node 300 to another engine node 300c and migrating that query 311 from the engine node 300 to another engine node 300c. Copying the query 311 means increasing the number of queries of the same group as the query 311 (i.e., raising the degree of parallelism), thus alleviating the load on the query 311. Migrating the query 311 means reducing the load on the engine node 300.

For example, the query 311 may be copied by copying a pertinent query program from the engine node 300 to the engine node 300c and starting up a query 315 in the engine node 300c on the basis of the copied query program. The copied query 315 on the engine node 300c runs in parallel with the source query 311 on the engine node 300. In contrast, the query 311 may be migrated by, for example, stopping the query 311, moving its query program from the engine node 300 to the engine node 300c, and starting up a query 315 in the engine node 300c on the basis of the moved query program.

The following description assumes that the existing query 311 on one engine node 300 is copied to another engine node 300c to produce a query 315 of the same group as the query 311. The manager node 600 sends a copy command to the engine 320 in the source engine node 300 and the engine in the destination engine node 300c (S301).

In response to the command from the manager node 600, the source engine node 300 transmits a query program that describes what the query 311 performs to the destination engine node 300c. The destination engine node 300c invokes a query 315 including an operator 315a on the basis of the query program received from the source engine node 300. The destination engine node 300c also reserves a state storage unit 315b to store internal state information of the query 315 (S302).

The source engine node 300 also extracts information about its query 311 from the sharing management table 331 and event management table 332 in the management data storage unit 330 and transmits the extracted information to the destination engine node 300c. What is sent from the source engine node 300 to the destination engine node 300c includes the established earliest arrival time, standby time, firing interval, firing limit count, and the like. The destination engine node 300c reserves a management data storage unit 330c to accommodate a sharing management table and an event management table and registers the information received from the source engine node 300 into these tables. The destination engine node 300c joins in this way the group of engine nodes 300, 300a, and 300b and share the earliest arrival time established among them. That is, a timer notice will be issued to the operator 315a in the query 315 synchronously with that to the operator 311a in the query 311 (S303).

Upon startup of the query 315, the manager node 600 updates routing tables of the nodes, as well as internal state information of queries 310 to 315, so that events from the query 310 will also be delivered to the query 315. More specifically, the manager node 600 enters a new value(s) to routing tables of the input adapter node 200 and the engine nodes 300, 300a, 300b, and 300c to register the fact that the new engine node 300c also has a query of the same group as the queries 311, 312, and 313. The manager node 600 also reviews the data ranges of the queries 311, 312, and 313 so as to properly distribute the load, and updates their respective internal state information accordingly.

How the query 311 is copied to another engine node 300c has been described above. The above-described delivery of the earliest arrival time and other information from the engine node 300 to the engine node 300c is also applicable to the case of migrating the query 311 to the engine node 300c. When deploying a new query 315, its host engine node 300c receives in this way the earliest arrival time and other information from another engine node, so that timer notices will be issued to an operator 315a of the query 315 at appropriate times. Although it is the engine node 300 in the above description that sends the earliest arrival time and other information, other engine nodes 300a and 300b may do the same if they have queries of the same group as the query 315. The manager node 600 may be configured to specify which engine node is to send the earliest arrival time and other information.

According to the distributed system of the second embodiment, a query 311 outputs a timer request 61 specifying an arrival time, which causes its hosting engine node 300 to inform other engine nodes of the specified arrival time. Such timer requests 61 may be produced from a plurality of queries 311, 312, and 313 of the same group nearly at the same time. The engine nodes 300, 300a, and 300b then establish an "earliest arrival time" as their common reference time. With reference to this unified "earliest arrival time," each engine node 300, 300a, and 300b manages the issuance timing of timer notices.

The above feature enables the distributed system to synchronize the issuance of timer notices from multiple queries 311, 312, and 313 in spite of the independent timer management in the engine nodes 300, 300a, and 300b. As a result, the parallel queries 311, 312, and 313 produce the same intended processing result as in the case of non-parallel execution of event processing, even though their source query program is not particularly designed for parallel event processing operations. This nature contributes to smooth parallelization of data manipulation and thus enhance the performance of the distributed system.

The users can write query programs with less burden since they do not need to explicitly describe a parallelization procedure. Each engine node runs an engine as its control software. The proposed distributed system also makes management of parallelism easier, because those engines and the manager node 600 alike can change the degree of parallelism of queries dynamically.

As part of the finalization procedure of earliest arrival times, the engine nodes may issue initial timer notices tentatively on the basis of their respective tentative arrival time. This is performed at the discretion of each engine node after expiration of a predetermined due time. Consequently the engine nodes 300, 300a, and 300b will never fail to issue initial timer notices even if they are unable to finish the finalization procedure due to large communication delays. In addition, when an existing query 311 is copied or migrated to a newly added engine node 300c, the source engine node informs the destination engine node 300c of the established earliest arrival time. This information enables the added engine node 300c to issue timer notices synchronously with other engine nodes 300, 300a, and 300b.

As mentioned previously, the system discussed in the first embodiment is implemented by executing programs on two information processing apparatuses 10 and 20. Also, the information processing according to the second embodiment is executed by executing programs on an input adapter node 200, engine nodes 300, 300a, 300b, and 300c, output adapter node 400, client device 500, and manager node 600. These programs may be encoded in a computer-readable storage medium (e.g., storage medium 43). Such storage media may be, for example, magnetic disk media, optical disc media, magneto-optical storage media, or semiconductor memory devices. Magnetic disk media include FD and HDD. Optical disc media include CD, CD-R (CD-Recordable), CD-RW (CD-Rewritable), DVD, DVD-R, and DVD-RW.

For example, portable storage media containing programs may be used for the purpose of circulation. For example, a computer installs programs in its storage device (e.g., HDD 303) from a portable storage medium and executes programs read out of the storage device. The computer may also execute programs by directly reading the code out of a portable storage medium. The above-described information processing may be wholly or partly implemented with a DSP, ASIC, programmable logic device (PLD), or other electronic circuits.

In one aspect, the proposed techniques make it easier to parallelize timer-reliant processes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program that causes a computer to perform a procedure comprising:
   obtaining a first timer event issuance request produced by
      a first process that the computer executes as one of a plurality of processes, the plurality of processes being executed in a distributed system;

determining a first reference time based on the first timer event issuance request;

receiving timer event issuance timing information including a second reference time from another computer that executes a second process as another one of the plurality of processes, the timer event issuance timing information relating to a timer event to be issued by said another computer in response to a second timer event issuance request produced by the second process;

establishing a common reference time from the first reference time and the second reference time, the common reference time being shared by the computer and said another computer; and issuing a timer event to the first process in response to the first timer event issuance request when a predetermined wait time elapses from the common reference time.

2. The non-transitory computer-readable storage medium according to claim 1, wherein:

the first reference time is used in determining when to issue a timer event; and the second reference time is used in determining when to issue a timer event.

3. The non-transitory computer-readable storage medium according to claim 1, wherein:

the establishing a common reference time includes tentatively determining a common reference time, depending on whether the first timer event issuance request has been obtained and whether the timer event issuance timing information is received, and finalizing the common reference time through a finalization procedure performed with said another computer; and the procedure further comprises issuing a timer event to the first process at a tentative issuance time determined from the tentatively determined common reference time, when the finalization procedure is not finished by the tentative issuance time or by a predetermined time before the tentative issuance time.

4. The non-transitory computer-readable storage medium according to claim 3, wherein:

the predetermined time is calculated based on an index that indicates quality of communication between the computer and said another computer.

5. The non-transitory computer-readable storage medium according to claim 1, the procedure further comprising:

notifying yet another computer different from the computer and said another computer of the common reference time, when a third process is invoked on said yet another computer.

6. The non-transitory computer-readable storage medium according to claim 1, wherein:

the first reference time is a time at which the first process receives data that satisfies a predetermined condition, and the second reference time is a time at which the second process receives data that satisfies the predetermined condition.

7. The non-transitory computer-readable storage medium according to claim 1, wherein:

the procedure further includes transmitting another piece of timer event issuance timing information to said another computer, said another piece of timer event issuance timing information relating to a timer event to be issued in response to the first timer event issuance request; and said another computer controls, based on said another piece of timer event issuance timing information, issuance timing of a timer event to the second process that is being requested by the second timer event issuance request.

8. The non-transitory computer-readable storage medium according to claim 1, wherein:

the predetermined wait time is specified by the first process and the second process.

9. An event management method comprising:

obtaining, by a first computer, a first timer event issuance request produced by a first process that the first computer executes as one of a plurality of processes, the plurality of processes being executed in a distributed system including a plurality of computers;

determining, by the first computer, a first reference time based on the first timer event issuance request;

transmitting timer event issuance timing information from the first computer to a second computer that executes a second process as another one of the plurality of processes, the timer event issuance timing information relating to a first timer event to be issued in response to the first timer event issuance request and including the first reference time;

establishing, by the second computer, a common reference time from the first reference time and a second reference time, the common reference time being shared by the first computer and the second computer, and the second reference time being determined based on a second timer event issuance request produced by the second process; and issuing, by the second computer, a second timer event to the second process in response to the second timer event issuance request when a predetermined wait time elapses from the common reference time.

10. A distributed system comprising:

a first information processing apparatus and a second information processing apparatus, wherein the first information processing apparatus includes:

a first processor configured to obtain a first timer event issuance request produced by a first process that the first information processing apparatus executes as one of a plurality of processes and determine a first reference time based on the first timer event issuance request, the plurality of processes being executed in the distributed system, and a communication hardware interface configured to transmit timer event issuance timing information to the second information processing apparatus, the timer event issuance timing information relating to a first timer event to be issued in response to the first timer event issuance request and including the first reference time, and wherein the second information processing apparatus includes:

a second processor configured to establish a common reference time from the first reference time and a second reference time, the common reference time being shared by the first computer and the second computer, and the second reference time being determined based on a second timer event issuance request produced by a second process that the second information processing apparatus executes as one of the plurality of processes, and issue a second timer event to the second process in response to the second timer event issuance request when a predetermined wait time elapses from the common reference time.

\* \* \* \* \*